United States Patent
Dixon et al.

(10) Patent No.: US 8,820,955 B2
(45) Date of Patent: Sep. 2, 2014

(54) POWER TOOL WITH LIGHT EMITTING ASSEMBLY

(71) Applicant: Black & Decker Inc., Newark, DE (US)

(72) Inventors: Eva J. Dixon, Columbia, MD (US); Daniel L. Krout, Abingdon, MD (US); Robert G. Kusmierski, York, PA (US); Stephen P. Osborne, Baltimore, MD (US); Amanda Miller, Joppa, MD (US); Jeffery D. Delcamp, Baltimore, MD (US); Corey G. Robertson, Felton, PA (US); Brian E. Friedman, Baltimore, MD (US); Eric E. Hatfield, Jacobus, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 13/933,625

(22) Filed: Jul. 2, 2013

(65) Prior Publication Data

US 2013/0286635 A1    Oct. 31, 2013

Related U.S. Application Data

(63) Continuation of application No. 12/859,036, filed on Aug. 18, 2010, now abandoned, which is a continuation-in-part of application No. 12/379,585, filed on Feb. 25, 2009, now Pat. No. 8,328,381.

(51) Int. Cl.
*B25B 23/18* (2006.01)
*F21V 33/00* (2006.01)
*B23B 45/00* (2006.01)
*B25B 21/00* (2006.01)
*B25F 5/02* (2006.01)

(52) U.S. Cl.
CPC .......... *F21V 33/0084* (2013.01); *B23B 45/003* (2013.01); *B25B 23/18* (2013.01); *B25B 21/00* (2013.01); *B25F 5/021* (2013.01)
USPC ........................................................ 362/119

(58) Field of Classification Search
CPC ...... B25B 23/18; B25F 5/021; F21V 33/0084
USPC ............................................................ 362/119
See application file for complete search history.

(56) References Cited

U.S. PATENT DOCUMENTS 1,565,566 A    12/1925   Hartley
2,038,911 A    4/1936    Stutz et al.
(Continued)

FOREIGN PATENT DOCUMENTS

DE    1410234 U    5/1937
DE    689848 C     4/1940
(Continued)

OTHER PUBLICATIONS

"DB10DL 10.8 Volt Lithium Ion Micro Driver Drill," Hitachi Power Tools, Hitachi Koki USA, Ltd.; internet: http://www.hitachipowertools.com/store_item.php?iID=611& arrPath=1,2,22,p611, p. 1-3.

(Continued)

*Primary Examiner* — Karabi Guharay
(74) *Attorney, Agent, or Firm* — Scott B. Markow

(57) ABSTRACT

A power tool includes a housing having a large diameter rear portion and a narrow diameter nosepiece. An end effector is rotatably coupled to the housing. A holder with a substantially annular holder body is received over the nosepiece and non-rotatably coupled to the housing. A substantially annular cover having at least one transparent surface, and an internal annular groove, is received at least partially inside the holder body, and non-rotatably and axially fixed with respect to the holder. A substantially annular printed circuit board is received at least partially inside the annular groove in the cover, and non-rotatably and axially fixed with respect to the cover. A plurality of lighting elements is operatively connected to the printed circuit board and radially disposed about the printed circuit board. The lighting elements are aligned with the at least one transparent surface so as to illuminate a workpiece.

20 Claims, 22 Drawing Sheets

(56) References Cited

U.S. PATENT DOCUMENTS

| | | |
|---|---|---|
| 2,242,536 A | 5/1941 | Montgomery |
| 2,310,166 A | 2/1943 | Way |
| 2,517,882 A | 8/1950 | Johnson |
| 2,525,414 A | 10/1950 | Kleinschmidt |
| 2,525,588 A | 10/1950 | Cameron et al. |
| 2,702,649 A | 2/1955 | Neilson |
| 2,730,263 A | 1/1956 | Neilson |
| 2,736,792 A | 2/1956 | Freeland |
| 2,773,974 A | 12/1956 | Markett |
| 2,806,492 A | 9/1957 | Becker |
| 2,852,051 A | 9/1958 | Bickner |
| 2,855,675 A | 10/1958 | Kolthoff et al. |
| 2,855,679 A | 10/1958 | Gibble |
| 3,109,238 A | 11/1963 | Marks |
| 3,144,584 A | 8/1964 | La Fiandre |
| 3,393,309 A | 7/1968 | Leach et al. |
| 3,499,226 A | 3/1970 | Hopkins |
| 3,561,462 A | 2/1971 | Jugler |
| 3,595,132 A | 7/1971 | Thacker |
| 3,603,782 A | 9/1971 | Wortmann |
| 3,656,727 A | 4/1972 | Greenlee |
| 3,681,627 A | 8/1972 | Murry et al. |
| 3,729,658 A | 4/1973 | Voitov |
| 3,919,541 A | 11/1975 | Chao |
| 3,977,278 A | 8/1976 | Jackson |
| 3,983,976 A | 10/1976 | Taylor |
| 4,078,869 A | 3/1978 | Honeycutt |
| 4,089,031 A | 5/1978 | Stevens |
| 4,131,203 A | 12/1978 | Bridges |
| 4,133,507 A | 1/1979 | Chervenak |
| 4,160,570 A | 7/1979 | Bridges |
| 4,246,506 A | 1/1981 | Vartanian et al. |
| 4,330,274 A | 5/1982 | Friedman et al. |
| 4,399,226 A | 8/1983 | Danielson et al. |
| 4,429,463 A | 2/1984 | Angell |
| 4,480,295 A | 10/1984 | Shuster |
| 4,480,301 A | 10/1984 | Pfaff et al. |
| 4,498,868 A | 2/1985 | Schuss |
| 4,536,000 A | 8/1985 | Rohm |
| 4,540,318 A | 9/1985 | Hornung et al. |
| 4,611,716 A | 9/1986 | Sorlien |
| 4,648,610 A | 3/1987 | Hegyi |
| 4,678,922 A | 7/1987 | Leininger |
| 4,703,850 A | 11/1987 | Walker |
| 4,809,426 A | 3/1989 | Takeuchi et al. |
| 4,833,782 A | 5/1989 | Smith |
| 4,839,777 A | 6/1989 | Janko et al. |
| 4,899,971 A | 2/1990 | Elkin |
| 4,930,628 A | 6/1990 | Bridges |
| 5,003,434 A | 3/1991 | Gonser et al. |
| 5,061,885 A | 10/1991 | Fukuhara |
| 5,068,652 A | 11/1991 | Kobayashi |
| 5,133,455 A | 7/1992 | Chow |
| 5,158,354 A | 10/1992 | Simonin |
| 5,166,225 A | 11/1992 | Asanuma et al. |
| 5,169,225 A | 12/1992 | Palm |
| 5,267,129 A | 11/1993 | Anderson |
| 5,276,595 A | 1/1994 | Patrie |
| 5,313,527 A | 5/1994 | Guberman et al. |
| 5,319,527 A | 6/1994 | Murphy et al. |
| 5,406,300 A | 4/1995 | Tokimoto et al. |
| 5,412,476 A | 5/1995 | Marantette |
| 5,412,546 A | 5/1995 | Huang |
| 5,427,002 A | 6/1995 | Edman |
| 5,473,519 A | 12/1995 | McCallops et al. |
| 5,525,842 A | 6/1996 | Leininger |
| 5,538,423 A | 7/1996 | Coss et al. |
| 5,543,679 A | 8/1996 | Morino et al. |
| 5,628,556 A | 5/1997 | Hrabar et al. |
| 5,637,973 A | 6/1997 | Hirai et al. |
| D380,952 S | 7/1997 | Kim |
| 5,713,656 A | 2/1998 | Lin |
| 5,720,542 A | 2/1998 | Birge, Jr. et al. |
| 5,770,936 A | 6/1998 | Hirai et al. |
| 5,793,130 A | 8/1998 | Anderson |
| 5,797,670 A | 8/1998 | Snoke et al. |
| 5,798,622 A | 8/1998 | Hirai et al. |
| 5,801,454 A | 9/1998 | Leininger |
| 5,818,188 A | 10/1998 | Hirai et al. |
| 5,845,986 A | 12/1998 | Breen |
| 5,873,647 A | 2/1999 | Kurtz et al. |
| 5,913,596 A | 6/1999 | Lin |
| 5,924,615 A | 7/1999 | McGarrah |
| 5,970,616 A | 10/1999 | Wahl et al. |
| 5,980,077 A | 11/1999 | Shiao |
| 5,982,059 A | 11/1999 | Anderson |
| 6,022,121 A | 2/2000 | Lin |
| 6,028,694 A | 2/2000 | Schmidt |
| 6,033,082 A | 3/2000 | Lin |
| 6,033,087 A | 3/2000 | Shozo et al. |
| 6,036,332 A | 3/2000 | Antal |
| 6,050,698 A | 4/2000 | Lee |
| 6,050,759 A | 4/2000 | Bone |
| 6,067,714 A | 5/2000 | Taylor et al. |
| 6,086,217 A | 7/2000 | Jau |
| 6,095,659 A | 8/2000 | Hsu |
| RE36,917 E | 10/2000 | Leininger |
| 6,126,295 A | 10/2000 | Hillinger |
| 6,135,608 A | 10/2000 | Lin |
| 6,145,995 A | 11/2000 | Hung |
| 6,161,256 A | 12/2000 | Quiring et al. |
| 6,168,287 B1 | 1/2001 | Liu |
| 6,168,301 B1 | 1/2001 | Martinez et al. |
| 6,178,081 B1 | 1/2001 | Armond et al. |
| 6,179,433 B1 | 1/2001 | Shiao |
| 6,183,103 B1 | 2/2001 | Hillinger |
| 6,206,538 B1 | 3/2001 | Lemoine |
| 6,213,620 B1 | 4/2001 | Huang et al. |
| 6,224,229 B1 | 5/2001 | Lin |
| 6,237,767 B1 | 5/2001 | Lee |
| 6,238,058 B1 | 5/2001 | Lin |
| 6,243,240 B1 | 6/2001 | Ozue et al. |
| 6,257,077 B1 | 7/2001 | Patterson |
| 6,260,979 B1 | 7/2001 | Lin |
| 6,260,980 B1 | 7/2001 | Ping |
| 6,280,047 B1 | 8/2001 | Chen |
| 6,283,607 B1 | 9/2001 | Lin |
| D449,506 S | 10/2001 | Haung |
| 6,318,874 B1 | 11/2001 | Matsunaga |
| 6,318,875 B1 | 11/2001 | Hrabar et al. |
| 6,322,177 B1 | 11/2001 | Vasudeva |
| 6,364,033 B1 | 4/2002 | Hung et al. |
| 6,401,996 B1 | 6/2002 | Thom et al. |
| 6,443,675 B1 | 9/2002 | Kopras et al. |
| 6,454,429 B1 | 9/2002 | Liao |
| 6,467,577 B1 | 10/2002 | Charlebois, Jr. |
| 6,478,442 B2 | 11/2002 | Chen |
| 6,494,590 B1 | 12/2002 | Paganini et al. |
| 6,497,494 B1 | 12/2002 | Lin |
| 6,501,199 B2 | 12/2002 | Hung |
| 6,502,947 B2 | 1/2003 | Matsumoto et al. |
| 6,502,949 B1 | 1/2003 | Horiyama et al. |
| 6,511,200 B2 | 1/2003 | Matsunaga |
| 6,511,201 B1 | 1/2003 | Elrod |
| 6,565,227 B1 | 5/2003 | Davis |
| 6,575,590 B1 | 6/2003 | Wadsworth |
| 6,616,295 B2 | 9/2003 | Sako et al. |
| 6,617,737 B1 | 9/2003 | Minalga et al. |
| 6,622,537 B2 | 9/2003 | Rodriguez |
| 6,644,825 B2 | 11/2003 | Lin |
| 6,663,260 B1 | 12/2003 | Tieszen |
| 6,694,631 B2 | 2/2004 | Bone et al. |
| 6,713,905 B2 | 3/2004 | Hirschburger et al. |
| 6,725,945 B2 | 4/2004 | Sugimoto et al. |
| 6,729,743 B2 | 5/2004 | Gillette |
| D493,345 S | 7/2004 | Allison |
| 6,803,683 B2 | 10/2004 | Bone et al. |
| 6,810,596 B2 | 11/2004 | Fung et al. |
| 6,814,461 B2 | 11/2004 | Minalga |
| 6,814,480 B2 | 11/2004 | Amano |
| 6,822,357 B2 | 11/2004 | Hung |
| 6,857,756 B2 | 2/2005 | Reiff et al. |
| 6,863,544 B2 | 3/2005 | Haehn et al. |
| 6,868,967 B2 | 3/2005 | Lam |

(56) References Cited

U.S. PATENT DOCUMENTS

| | | | |
|---|---|---|---|
| RE38,729 E | 4/2005 | Liu | |
| 6,886,961 B2 * | 5/2005 | Hara et al. | 362/652 |
| 6,890,135 B2 | 5/2005 | Kopras et al. | |
| 6,899,451 B2 | 5/2005 | Kittelmann et al. | |
| 6,905,015 B2 | 6/2005 | Hernandez, Jr. et al. | |
| 6,905,221 B2 | 6/2005 | Hsu | |
| 6,916,106 B2 | 7/2005 | Xingguo | |
| 6,918,331 B2 | 7/2005 | Okouchi | |
| 6,921,235 B2 | 7/2005 | Chen | |
| 6,939,022 B2 | 9/2005 | Brooks | |
| 6,960,867 B2 | 11/2005 | Dupont et al. | |
| 6,961,190 B1 | 11/2005 | Tamaoki et al. | |
| 6,964,545 B1 | 11/2005 | Languasco | |
| 6,979,100 B2 | 12/2005 | Reiff et al. | |
| 6,979,104 B2 | 12/2005 | Brass et al. | |
| 6,991,105 B2 | 1/2006 | Winnard | |
| 7,006,306 B2 | 2/2006 | Falicoff et al. | |
| 7,007,762 B2 | 3/2006 | Yamamoto | |
| 7,025,485 B2 | 4/2006 | Henry | |
| 7,029,142 B2 | 4/2006 | Chen et al. | |
| 7,053,325 B2 | 5/2006 | Yuasa et al. | |
| 7,054,411 B2 | 5/2006 | Katcha et al. | |
| 7,066,691 B2 * | 6/2006 | Doyle et al. | 408/124 |
| 7,069,662 B2 | 7/2006 | Fung et al. | |
| 7,080,964 B2 | 7/2006 | Riley et al. | |
| 7,090,372 B2 | 8/2006 | Liao et al. | |
| 7,093,951 B2 | 8/2006 | Tsuruta et al. | |
| 7,094,011 B2 | 8/2006 | Kopras et al. | |
| 7,095,142 B2 | 8/2006 | Leininger | |
| 7,101,058 B2 | 9/2006 | Prell et al. | |
| 7,137,761 B2 | 11/2006 | Hara et al. | |
| 7,147,411 B2 | 12/2006 | Astakhov et al. | |
| 7,152,329 B2 | 12/2006 | Kondo et al. | |
| 7,185,998 B2 | 3/2007 | Oomori et al. | |
| 7,188,966 B1 | 3/2007 | Lin | |
| 7,195,428 B2 | 3/2007 | Astakhov et al. | |
| 7,197,113 B1 | 3/2007 | Katcha et al. | |
| 7,200,516 B1 | 4/2007 | Cowley | |
| 7,204,606 B2 | 4/2007 | Brass et al. | |
| 7,228,983 B2 | 6/2007 | Pangerc et al. | |
| 7,249,862 B2 | 7/2007 | Shirane | |
| 7,253,541 B2 | 8/2007 | Kovarik et al. | |
| 7,258,230 B2 | 8/2007 | Hernandez, Jr. et al. | |
| 7,278,751 B2 | 10/2007 | Chang et al. | |
| 7,282,818 B2 | 10/2007 | Kovarik | |
| 7,296,905 B2 | 11/2007 | Etter et al. | |
| D557,099 S | 12/2007 | Lin | |
| 7,303,007 B2 | 12/2007 | Konschuh et al. | |
| 7,307,230 B2 | 12/2007 | Chen | |
| 7,318,485 B2 | 1/2008 | Greese et al. | |
| 7,331,113 B1 | 2/2008 | Patrick et al. | |
| 7,331,685 B2 | 2/2008 | Shen et al. | |
| 7,339,323 B2 | 3/2008 | Bucur | |
| 7,357,526 B2 | 4/2008 | Zeiler | |
| 7,395,876 B1 | 7/2008 | Walker | |
| 7,404,696 B2 | 7/2008 | Campbell | |
| 7,483,220 B2 | 1/2009 | Kittelmann et al. | |
| 7,498,526 B2 | 3/2009 | Lohr et al. | |
| 7,510,296 B2 | 3/2009 | Nevin | |
| 7,552,781 B2 | 6/2009 | Zhang et al. | |
| 7,559,427 B2 | 7/2009 | Hu | |
| 7,568,288 B2 | 8/2009 | Baker | |
| 7,568,816 B2 | 8/2009 | Brass et al. | |
| 7,600,885 B2 | 10/2009 | Canino et al. | |
| 7,654,178 B2 | 2/2010 | Hall et al. | |
| 7,677,752 B2 | 3/2010 | Tadokoro et al. | |
| 7,681,659 B2 | 3/2010 | Zhang et al. | |
| 7,682,035 B2 | 3/2010 | Wuensch et al. | |
| 7,682,036 B2 | 3/2010 | Reiff et al. | |
| 7,703,950 B2 | 4/2010 | Ewert et al. | |
| 7,705,482 B2 | 4/2010 | Leininger | |
| 7,717,619 B2 | 5/2010 | Katcha et al. | |
| 7,726,863 B2 | 6/2010 | Brandstaetter et al. | |
| 7,728,464 B2 | 6/2010 | Leininger | |
| 7,736,009 B2 | 6/2010 | Quattrini | |
| 7,740,369 B2 | 6/2010 | Gabriel et al. | |
| 7,815,356 B2 | 10/2010 | Lutz et al. | |
| 7,824,136 B2 | 11/2010 | Campbell | |
| 7,850,325 B2 | 12/2010 | Wall et al. | |
| 7,866,839 B2 | 1/2011 | Chien | |
| 7,926,187 B2 | 4/2011 | Uehlein-Proctor et al. | |
| 7,934,847 B2 | 5/2011 | Oomori et al. | |
| 8,016,048 B2 | 9/2011 | Ueda et al. | |
| 8,042,966 B2 | 10/2011 | Lutz et al. | |
| 8,075,155 B2 | 12/2011 | Watanabe et al. | |
| 8,091,650 B2 | 1/2012 | Van der Linde et al. | |
| 8,317,350 B2 | 11/2012 | Friedman et al. | |
| 8,328,381 B2 | 12/2012 | Dixon et al. | |
| 8,360,593 B2 | 1/2013 | Kim et al. | |
| 8,382,308 B2 | 2/2013 | Hecht et al. | |
| 8,529,084 B2 | 9/2013 | Roehm | |
| 2002/0054491 A1 | 5/2002 | Casas | |
| 2002/0131267 A1 | 9/2002 | Van Osenbruggen | |
| 2002/0136021 A1 | 9/2002 | Hung | |
| 2002/0154499 A1 | 10/2002 | Hsieh | |
| 2002/0172035 A1 | 11/2002 | Hara et al. | |
| 2002/0179437 A1 | 12/2002 | Ko | |
| 2002/0197123 A1 | 12/2002 | Kopras et al. | |
| 2003/0194283 A1 | 10/2003 | Kovarik et al. | |
| 2003/0202851 A1 | 10/2003 | Kovarik | |
| 2004/0084342 A1 | 5/2004 | Chang | |
| 2004/0156190 A1 | 8/2004 | Tsuruta et al. | |
| 2005/0044728 A1 | 3/2005 | Baker | |
| 2005/0047878 A1 | 3/2005 | Riley et al. | |
| 2005/0085124 A1 | 4/2005 | Kristen et al. | |
| 2005/0111214 A1 | 5/2005 | Zeiler | |
| 2005/0135800 A1 * | 6/2005 | Nguyen et al. | 396/463 |
| 2005/0152131 A1 | 7/2005 | Shirane | |
| 2005/0157260 A1 | 7/2005 | Graham et al. | |
| 2005/0157489 A1 | 7/2005 | Oomori et al. | |
| 2005/0157849 A1 | 7/2005 | Radley et al. | |
| 2005/0185300 A1 | 8/2005 | Kittelmann et al. | |
| 2005/0188550 A1 | 9/2005 | Uehlein-Proctor et al. | |
| 2005/0199522 A1 | 9/2005 | Hu | |
| 2005/0218023 A1 | 10/2005 | Winnard | |
| 2005/0221664 A1 | 10/2005 | Winnard | |
| 2005/0247585 A1 | 11/2005 | Breckwoldt et al. | |
| 2005/0248933 A1 | 11/2005 | Chen et al. | |
| 2005/0261870 A1 | 11/2005 | Cramer et al. | |
| 2006/0104085 A1 | 5/2006 | Walker et al. | |
| 2006/0104732 A1 | 5/2006 | Huang | |
| 2006/0113930 A1 | 6/2006 | Andriolo | |
| 2006/0157260 A1 | 7/2006 | Greese et al. | |
| 2006/0176682 A1 | 8/2006 | Wu et al. | |
| 2006/0180327 A1 | 8/2006 | Nagasaka et al. | |
| 2006/0234846 A1 | 10/2006 | Tucker | |
| 2006/0243105 A1 | 11/2006 | Delfini et al. | |
| 2006/0250057 A1 | 11/2006 | Vasudeva | |
| 2006/0262519 A1 | 11/2006 | Hirschburger et al. | |
| 2006/0289595 A1 | 12/2006 | Shen et al. | |
| 2007/0046110 A1 | 3/2007 | Liu | |
| 2007/0138971 A1 | 6/2007 | Chen | |
| 2007/0159812 A1 | 7/2007 | Oomori et al. | |
| 2007/0193039 A1 | 8/2007 | Onose et al. | |
| 2008/0025017 A1 | 1/2008 | Tadokoro et al. | |
| 2008/0041746 A1 | 2/2008 | Hsiao | |
| 2008/0060847 A1 | 3/2008 | Konschuh et al. | |
| 2008/0068827 A1 | 3/2008 | Chang | |
| 2008/0074865 A1 | 3/2008 | Lutz et al. | |
| 2008/0144309 A1 | 6/2008 | Nagata et al. | |
| 2008/0149678 A1 | 6/2008 | Huang | |
| 2008/0150439 A1 | 6/2008 | Bucur | |
| 2008/0158861 A1 | 7/2008 | Chiang | |
| 2008/0215056 A1 | 9/2008 | Miller et al. | |
| 2008/0244910 A1 | 10/2008 | Patel | |
| 2008/0264212 A1 | 10/2008 | Leupert | |
| 2008/0266841 A1 | 10/2008 | Gabriel et al. | |
| 2008/0271906 A1 | 11/2008 | Walker | |
| 2008/0278931 A1 | 11/2008 | Wu et al. | |
| 2008/0314795 A1 | 12/2008 | Lin | |
| 2009/0013477 A1 | 1/2009 | Agronin et al. | |
| 2009/0077814 A1 | 3/2009 | Gibbons et al. | |
| 2009/0077816 A1 | 3/2009 | Gibbons et al. | |
| 2009/0077817 A1 | 3/2009 | Gibbons et al. | |

(56) References Cited

U.S. PATENT DOCUMENTS

| | | |
|---|---|---|
| 2009/0077819 A1 | 3/2009 | Kuehne et al. |
| 2009/0080987 A1 | 3/2009 | Canino et al. |
| 2009/0123817 A1 | 5/2009 | Stickel et al. |
| 2009/0128062 A1 | 5/2009 | Watanabe et al. |
| 2009/0134710 A1 | 5/2009 | Tyndall et al. |
| 2009/0141482 A1 | 6/2009 | Wall et al. |
| 2009/0145259 A1 | 6/2009 | Wall et al. |
| 2009/0159677 A1 | 6/2009 | Yakimov et al. |
| 2009/0200961 A1 | 8/2009 | Straub |
| 2009/0207035 A1 | 8/2009 | Watanabe et al. |
| 2009/0256319 A1 | 10/2009 | Seymour et al. |
| 2009/0309519 A1 | 12/2009 | Suzuki et al. |
| 2009/0313831 A1 | 12/2009 | Patel |
| 2010/0000094 A1 | 1/2010 | Lombardo |
| 2010/0002415 A1 | 1/2010 | Munn et al. |
| 2010/0008079 A1 | 1/2010 | Brass et al. |
| 2010/0038103 A1 | 2/2010 | Ueda et al. |
| 2010/0043603 A1 | 2/2010 | McRoberts et al. |
| 2010/0053940 A1 | 3/2010 | Yaksich |
| 2010/0071921 A1 | 3/2010 | Canino et al. |
| 2010/0072833 A1 | 3/2010 | Canino et al. |
| 2010/0074700 A1 | 3/2010 | Canino et al. |
| 2010/0089601 A1 | 4/2010 | Fukinuki et al. |
| 2010/0148505 A1 | 6/2010 | Dunlap et al. |
| 2010/0149790 A1 | 6/2010 | Leong |
| 2010/0214768 A1 | 8/2010 | Dixon et al. |
| 2010/0242695 A1 | 9/2010 | Xu et al. |
| 2010/0277897 A1 | 11/2010 | Hecht et al. |
| 2010/0315804 A1 | 12/2010 | Nishikimi et al. |
| 2010/0328929 A1 | 12/2010 | Lutz et al. |
| 2010/0328969 A1 | 12/2010 | Meyer |
| 2011/0017473 A1 | 1/2011 | Clarkson et al. |
| 2011/0040235 A1 | 2/2011 | Castel |
| 2011/0058356 A1 | 3/2011 | Friedman et al. |
| 2011/0170312 A1 | 7/2011 | Parrinello |
| 2011/0197458 A1 | 8/2011 | Karrar et al. |
| 2012/0236545 A1 | 9/2012 | Van der Linde et al. |
| 2012/0243225 A1 | 9/2012 | Lee et al. |
| 2013/0021783 A1 | 1/2013 | Vanko et al. |

FOREIGN PATENT DOCUMENTS

| | | |
|---|---|---|
| DE | 689848 C | 4/1940 |
| DE | 6806826 U | 3/1969 |
| DE | 6806826 U | 3/1969 |
| DE | 1808818 A1 | 6/1970 |
| DE | 2529668 A1 | 1/1977 |
| DE | 7704943 U1 | 6/1977 |
| DE | 7704943 U1 | 6/1977 |
| DE | 2819691 A1 | 11/1979 |
| DE | 3003703 A1 | 8/1980 |
| DE | 8529779 U1 | 12/1985 |
| DE | 3525352 A1 | 1/1987 |
| DE | 3831344 A1 | 3/1990 |
| DE | 8912224 U1 | 12/1990 |
| DE | 4202223 A1 | 9/1992 |
| DE | 4229282 A1 | 5/1993 |
| DE | 4336730 A1 | 5/1995 |
| DE | 4420999 A1 | 12/1995 |
| DE | 4420999 A1 | 12/1995 |
| DE | 29709437 U1 | 9/1997 |
| DE | 29719020 U1 | 12/1997 |
| DE | 29807070 U1 | 6/1998 |
| DE | 29818802 U1 | 1/1999 |
| DE | 29818802 U1 | 1/1999 |
| DE | 29907922 U1 | 8/1999 |
| DE | 29907922 U1 | 8/1999 |
| DE | 10119010 A1 | 10/2002 |
| DE | 20201300 U1 | 7/2003 |
| DE | 20201300 U1 | 7/2003 |
| DE | 20215382 U1 | 9/2003 |
| DE | 20310541 U1 | 9/2003 |
| DE | 10315980 A1 | 11/2003 |
| DE | 10246772 A1 | 4/2004 |
| DE | 202004019853 U1 | 2/2005 |
| DE | 10340178 B3 | 4/2005 |
| DE | 10356384 A1 | 6/2005 |
| DE | 10356384 A1 | 6/2005 |
| DE | 102004011575 A1 | 9/2005 |
| DE | 202007010340 U1 | 10/2007 |
| DE | 202007010340 U1 | 10/2007 |
| DE | 102006045157 A1 | 4/2008 |
| DE | 102006049925 A1 | 4/2008 |
| DE | 102006049925 A1 | 4/2008 |
| DE | 202008003787 U1 | 6/2008 |
| DE | 202008016901 U1 | 3/2009 |
| DE | 202008016901 U1 | 3/2009 |
| DE | 102011075663 A1 | 11/2012 |
| DE | 102011075663 A1 | 11/2012 |
| DE | 102011077440 A1 | 12/2012 |
| DE | 102011077440 A1 | 12/2012 |
| DE | 102011077441 A1 | 12/2012 |
| DE | 102011077441 A1 | 12/2012 |
| DE | 102011077442 A1 | 12/2012 |
| DE | 102011077442 A1 | 12/2012 |
| DE | 102011077443 A1 | 12/2012 |
| DE | 102011077443 A1 | 12/2012 |
| DE | 102011077444 A1 | 12/2012 |
| DE | 102011077444 A1 | 12/2012 |
| DE | 102011077451 A1 | 12/2012 |
| DE | 102011077451 A1 | 12/2012 |
| EP | 0280527 A1 | 8/1988 |
| EP | 0280527 A2 | 8/1988 |
| EP | 1068934 A1 | 1/2001 |
| EP | 1072842 A2 | 1/2001 |
| EP | 1125698 A2 | 8/2001 |
| EP | 1287948 A2 | 3/2003 |
| EP | 1477282 A1 | 11/2004 |
| EP | 1690649 A1 | 8/2006 |
| EP | 1693162 A2 | 8/2006 |
| EP | 2199024 A1 | 6/2010 |
| EP | 2199024 A1 | 6/2010 |
| EP | 2223783 A1 | 9/2010 |
| EP | 2223783 A1 | 9/2010 |
| FR | 667849 A | 10/1929 |
| GB | 2041189 A | 9/1980 |
| GB | 2041189 A | 9/1980 |
| GB | 2041798 A | 9/1980 |
| GB | 2305128 A | 4/1997 |
| GB | 2375497 A | 11/2002 |
| GB | 2375497 A | 11/2002 |
| GB | 2407058 A | 4/2005 |
| JP | S6450447 A | 3/1989 |
| JP | S6460447 A | 3/1989 |
| JP | 3138168 A | 6/1991 |
| JP | 5309508 A | 11/1993 |
| JP | 06246645 A | 9/1994 |
| JP | 8252778 A | 10/1996 |
| JP | 9239672 A | 9/1997 |
| JP | 10034564 A | 2/1998 |
| JP | 10034564 A | 2/1998 |
| JP | 10034565 A | 2/1998 |
| JP | 10034566 A | 2/1998 |
| JP | 11111002 A | 4/1999 |
| JP | 3079279 B2 | 8/2000 |
| JP | 2002166374 A | 6/2002 |
| JP | 2002307325 A | 10/2002 |
| JP | 2002307330 A | 10/2002 |
| JP | 2003033901 A | 2/2003 |
| JP | 2003211374 A | 7/2003 |
| JP | 2004174667 A | 6/2004 |
| JP | 2006218583 A | 8/2006 |
| JP | 2009214239 A | 9/2009 |
| JP | 2009214239 A | 9/2009 |
| JP | 2010207972 A | 9/2010 |
| JP | 2010207972 A | 9/2010 |
| WO | WO-9902310 A2 | 1/1999 |
| WO | WO-03061915 A1 | 7/2003 |
| WO | 2005018855 A1 | 3/2005 |
| WO | WO-2005018855 A1 | 3/2005 |
| WO | WO-2006015909 A1 | 2/2006 |
| WO | WO-2008133339 A1 | 11/2008 |
| WO | 2009080404 A1 | 7/2009 |

(56) References Cited

FOREIGN PATENT DOCUMENTS

| WO | WO-2009080404 A1 | 7/2009 |
|----|------------------|--------|
| WO | 2009138269 A1 | 11/2009 |
| WO | WO-2009138269 A1 | 11/2009 |
| WO | WO-2010034566 A1 | 4/2010 |

OTHER PUBLICATIONS

Photographs of disassembled tools currently being sold. Hitachi brochure. Date unknown.
David, Radu—European Search Report for EP 12177787—Oct. 22, 2013—4 pages—The Hague.
David, Radu—European Search Report for EP 13176802—Oct. 22, 2013—6 pages—The Hague.
"DB1ODL 10.8 Volt Lithium Ion Micro Driver Drill," Hitachi Power Tools, Hitachi Koki USA, Ltd.; internet: http://www.hitachipowertools.com/store_item.php?iID=611&arrPath=1,2,22,p611, p. 1-3.
"Eluminate Series," Makita, internet: http://www.makita.com/tools_item_view.asp?Id=638.
Print-off from unknown website.
Photographs of disassembled tools currently being sold. Hitachi brochure. Date unknown.
Photographs of a partly disassembled currently sold Bosch tool.
Printouts of tools from websites. Website and date unknown.
Photocopies of brochures. Dated as marked.
David, Radu—European Search Report re EP 12 17 7787—Oct. 22, 2013—4 pp—The Hague.
David, Radu—European Search Report re EP 13 17 6802—Oct. 22, 2013—6 pp—The Hague.

* cited by examiner

POWER TOOL WITH LIGHT EMITTING ASSEMBLY

CROSS REFERENCE TO RELATED APPLICATIONS

This application is a continuation of U.S. patent application Ser. No. 12/859,036, filed Aug. 18, 2010, titled "Power Tool with Light Emitting Assembly," which is a continuation-in-part of U.S. patent application Ser. No. 12/379,585, filed Feb. 25, 2009, now U.S. Pat. No. 8,328,381, titled "Light For Power Tool and Method of Illuminating a Workpiece." Each of these applications is incorporated herein by reference.

TECHNICAL FIELD

The present application relates generally to handheld power tools. More particularly, the present application relates to handheld power tools having a light configured to shine onto a workpiece machined by the power tool.

BACKGROUND

This section provides background information related to the present disclosure which is not necessarily prior art.

Power tools are often used in a variety of conditions ranging from well-lit indoor work spaces to outside construction sites or other areas that are not always well-lit. Accordingly, it is desirable to provide a method or apparatus that permits a power tool to have a lighting feature that will illuminate the workpiece that is being machined or worked on by the power tool. Such a lighting feature will assist a user to be able to adequately see the workpiece or work area that is being worked on or machined by the power tool even in substandard light conditions.

Because power tools may be used in adverse environmental conditions, it is desirable to protect such a lighting feature from the adverse environmental conditions.

SUMMARY

This section provides a general summary of the disclosure, and is not a comprehensive disclosure of its full scope or all of its features. In accordance with one embodiment of the present teachings, a power tool is provided. The power tool includes a housing, an end effector rotatable with respect to the housing, a collar non-rotatable with respect to the housing, a printed circuit board (PCB) fixed with respect to the housing a heat stake process, and a lighting element operatively connected to the PCB. The lighting element is adjacent to the end effector and in a recess of a transparent housing and located to illuminate a workpiece machined by the power tool.

In accordance with another embodiment of the present teachings, a power tool is provided. The power tool includes a rotatable end effector, a non-rotatable collar, and a circular printed circuit board (PCB). Surface mount lighting elements are operatively connected to the PCB and are adjacent to the end effector to illuminate a workpiece machined by the power tool. The collar has a transparent cover supporting the PCB and wires configured to provide power to the PCB for illuminating the lighting elements. The lighting elements are annularly arranged on the PCB about the end effector. A portion of the end effector extends through a hole defined by the transparent cover and PCB. The transparent cover defines a groove and the PCB is coupled in the groove using a heat staking process.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further areas of applicability will become apparent from the description provided herein. The description and specific examples in this summary are intended for purposes of illustration only and are not intended to limit the scope of the present disclosure.

DETAILED DESCRIPTION

Figure 1:
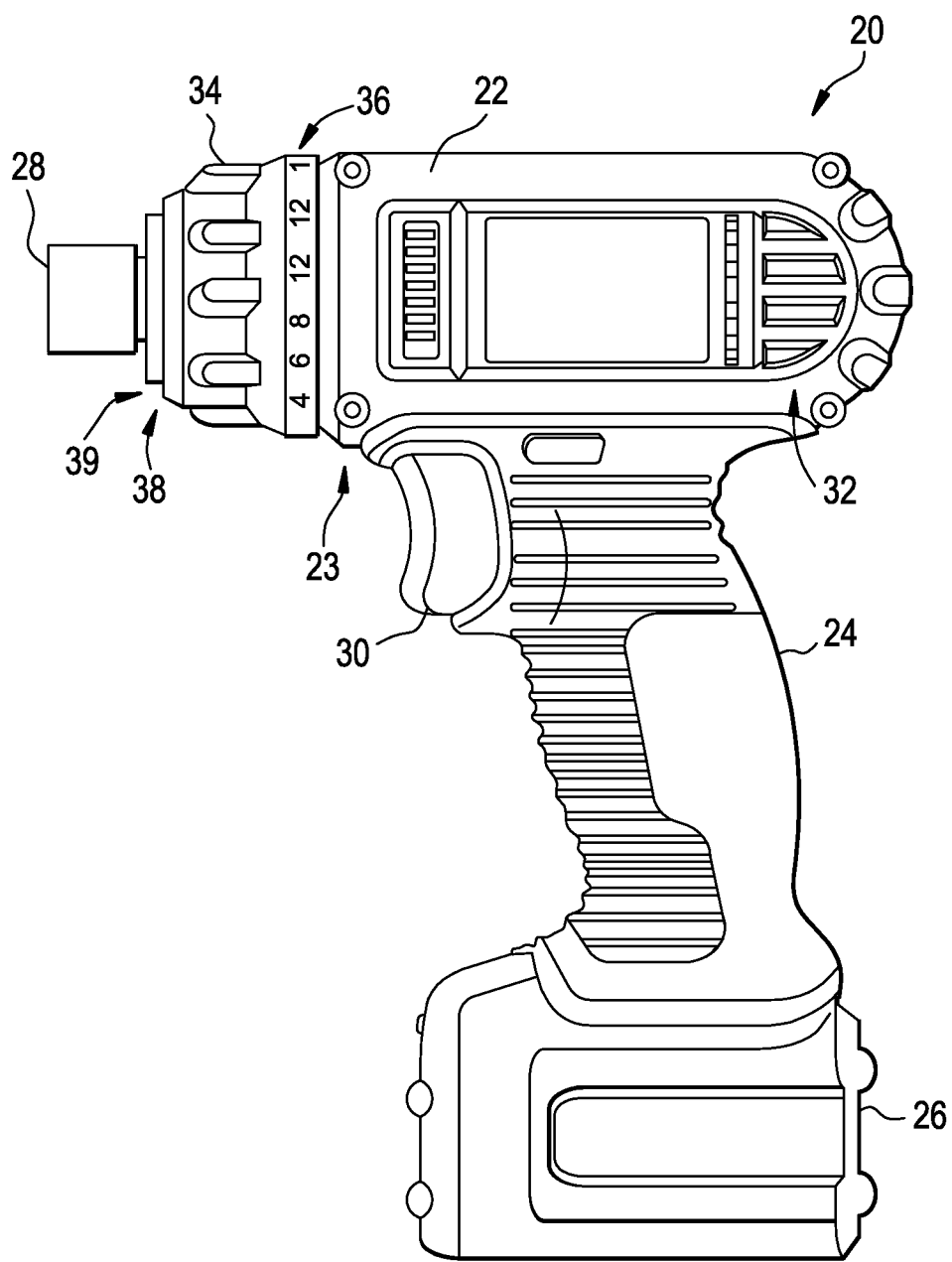
FIG. 1 is a side view illustrating a power tool in accordance with an embodiment of the invention.

The invention will now be described with reference to the drawing figures, in which like reference numerals refer to like parts throughout. Embodiments in accordance with the present invention provide a power tool having a light ring configured to shine light onto a workpiece being machined by the power tool.

According to some embodiments of the invention, light emitting elements, such as light emitting diodes (LEDs), are placed in an annular or ring shape around part of the end effector and are configured to shine forward to illuminate the tool or accessory held by the end effector and the workpiece being machined by the tool. The end effector may be a tool or accessory holder mounted to an output spindle of the tool, as described in U.S. patent application Ser. No. 12/394,426, entitled "Bit Retention Device" filed on Feb. 27, 2009, the contents being incorporated herein by reference in its entirety. Other examples of end effectors that may be used in accordance with the invention may be the 7000 Series chuck manufactured and marketed by the Jacobs Chuck Manufacturing Company of Clemson, S.C. and quick change chucks similar to that which is found on products such as a DC825KA Impact Driver and a DC815KA Impact Driver that are manufactured and marketed by the DeWalt Industrial Tool Company of Baltimore, Md.

While several different types of lighting elements can be used in accordance with the invention, such as light bulbs (for example, xenon bulbs) or other lighting elements, LED lights are discussed here as an example and do not limit embodiments in accordance with the invention to tools using LEDs. The LED lights, or other lighting elements, and associated parts are locked to the housing of the tool and do not rotate when the power tool is operated. The lights may be powered by the same power source that provides power to the power tool's motor. In the case of most cordless power tools, it is a battery that powers the power tool and in the case of corded tools it is AC current provided from source voltage through a cord. This AC current may be modified according to the needs of the lighting device being employed. In the case of LED lights, a rectifier may be employed to convert AC current to DC.

A first embodiment in accordance with the present teachings is illustrated in FIG. 1. A power tool 50 has a housing 51 which can be of a clam shell type or any other suitable type housing. The power tool 50 may have a transmission housing 56 located at the front portion of the power tool 50 to encapsulate a portion of an end effector 53. A handle 57 projects downwardly from the housing 51 and is terminated with a battery. The transmission housing of the embodiment of FIG. 1a contains a speed reduction transmission (e.g., a single-stage planetary transmission) and an impact mechanism that provides an intermittent rotary impact to the end effector (e.g., a Pott mechanism). The transmission housing of the embodiment of FIG. 1b contains a speed reduction transmission (e.g., a multi-stage planetary transmission) and at least a portion of a torque clutch that disengages when a predetermined torque is reached. The end effector 28 may be configured to hold an accessory or tool such as a drill bit or a driving type accessory such as a Philips or standard screwdriver. Other types of tools or accessories may be held and used in the end effector 28 as can appreciated by one skilled in the art. The movement of the end effector 28 may be controlled by the trigger 30. The trigger 30 may selectively provide power from the battery 26 to the motor 32 located within the housing 22. In some embodiments of the invention, the more the trigger or switch 30 is depressed the more power may be applied to the motor 32 which may cause the end effector 28 to spin faster.

The power tool 20 may be equipped with a clutch collar 34. Other embodiments in accordance with the invention may not have a rotating clutch collar, but rather a different rotating collar mechanism. The rotating collar mechanism may be a drill/hammer mode selector, a gear shifter, an on/off switch, a tool variable speed control or other rotating collar control mechanism. However, this specification will refer to a clutch collar as an example but does not limit embodiments in accordance with the invention to tools having clutch collars. The clutch collar 34 can provide protection for interior portions of the power tool 20, particularly the transmission and other internal components of the power tool 20 that may be mounted on the nose cone 23. The clutch collar 34 may be rotated to adjust the transmission. An example of a clutch and transmission that may work in accordance with the invention is shown in U.S. Pat. No. 7,066,691 which is incorporated by reference in its entirety. Of course, most any type of clutch and transmission may be used in accordance with the invention. Different angular positions of the clutch collar 34 may provide different amounts of torque and/or speed to the end effector 28 for a given trigger 30 position. A numbered scale 36 may appear on the clutch collar 34 in order to provide a user an indication of the setting of the clutch collar 34. In some embodiments the user may turn the clutch collar 34 to a desired position by hand. A light ring 38 is located on a front portion of the power tool 20 just behind the end effector 28 in a recess 39 in the clutch collar 34.

Figure 2:
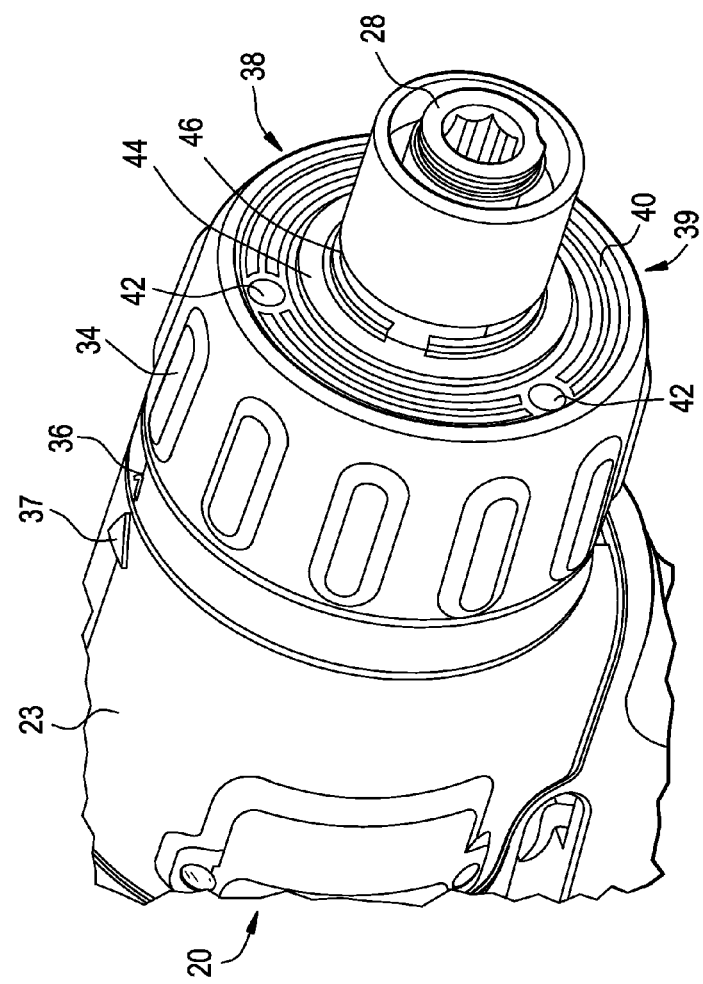
FIG. 2 is a perspective view illustrating a front portion of a power tool in accordance with an embodiment of the invention.
Figure 5:
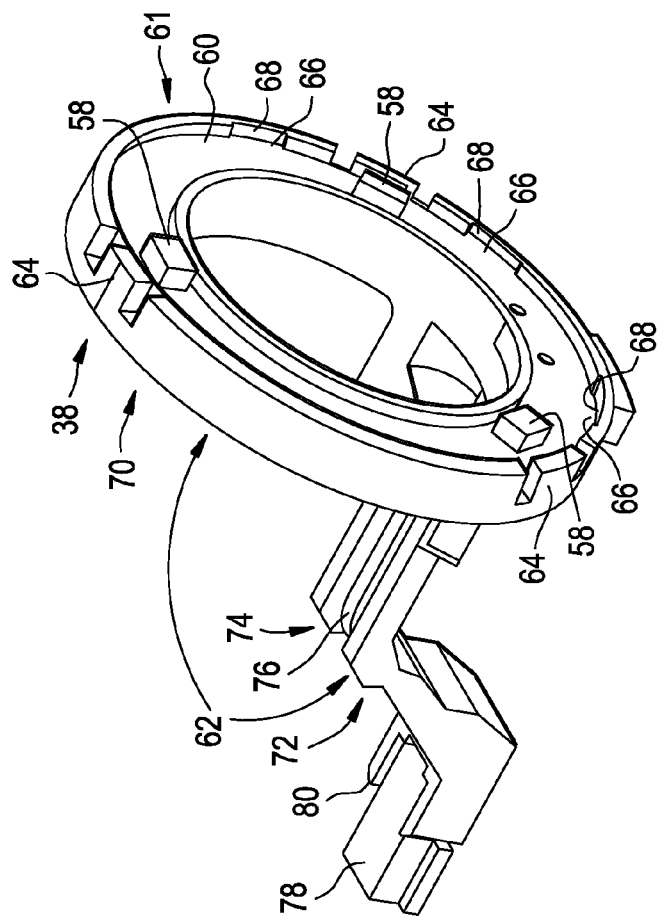
FIG. 5 is a perspective view of a wire guide and printed circuit board (PCB) having light emitting diode (LED) elements.

In FIG. 2, a partial perspective view of a front portion of the power tool 20 is shown. An indicator 37 may be located on the nose cone 23. The indicator 37 may provide a reference for the user for determining the angular position of the clutch collar 34 and a reference point for comparing the numbers on the numbered scale 36. The light ring 38 is located within a recess 39 of the clutch collar 34. The light ring 38 may include a lens cover 40. The lens cover 40 may protect interior components of the tool from moisture or other contaminants. The lens cover 40 may include blisters 42 located on the lens cover 40 as to be directly over the LEDs 58 (as shown in FIG. 5). The blisters 42 may be translucent or clear in order to permit light generated by the LEDs 58 to pass through. In some embodiments the blisters 42 may direct or focus the light. The blisters 42 may be round, rectangular, square or any other shape. In some embodiments the blisters 42 are shaped to correspond with the shape of the lighting elements 58. In other embodiments the light may simply pass through the blisters 42. The remainder of the lens cover 40 may be a dark color. Other color schemes may be used in accordance with the invention.

The lens cover 40 is held axially in place from moving in a forward direction toward the end effector 28 by retaining ring 44. The retaining ring 44 is mounted on a retainer 46 which is part of the nose cone 37 as better illustrated in FIGS. 13 and 14 and described in more detail later below.

Figure 3:
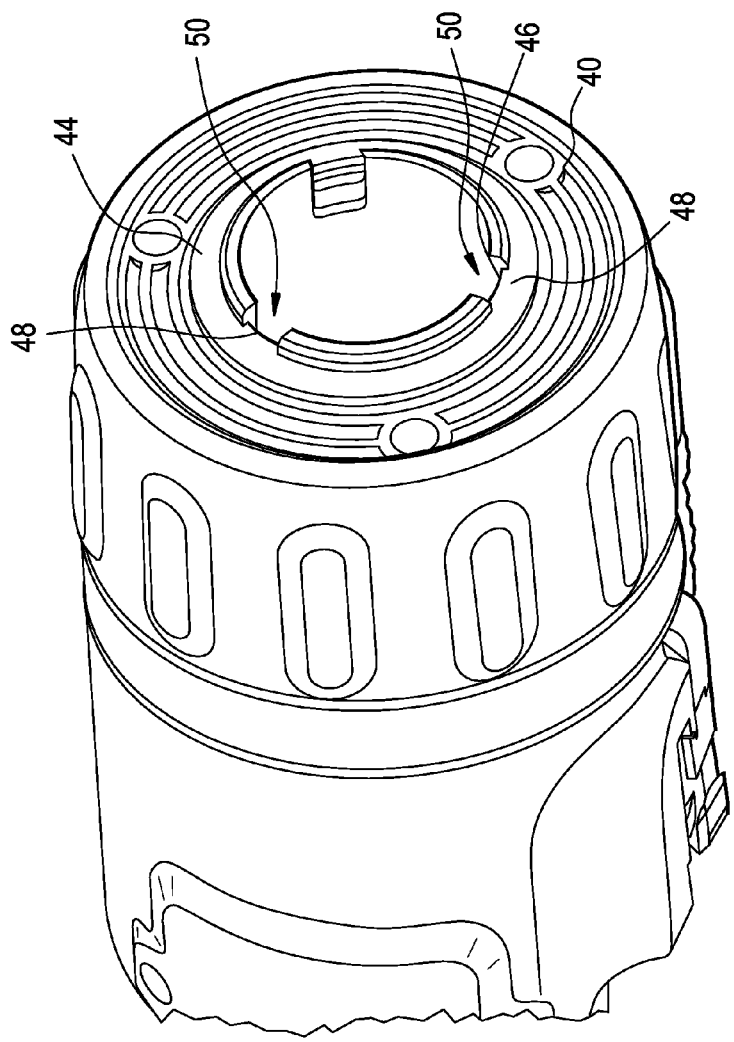
FIG. 3 is a perspective close-up view of the power tool of FIG. 2 with the end effector removed in order to more distinctly show surrounding elements.

FIG. 3 is a similar view to that shown in FIG. 2, however, the end effector 28 is removed to better illustrate certain features associated with the retaining ring 44 and the retainer 46. FIG. 3 shows portions 48 of the retaining ring 44 exposed in gap 50 that would fit within the groove 52 if it were not in the gap 50. The retaining ring 44 fits within a groove 52 in the retainer 46. When the retaining ring 44 is placed in the groove 52 the retaining ring 44 is secured in place. The retaining ring 44 prevents the lens cover 40 from axially moving forward toward the end effector 28.

Figure 4:
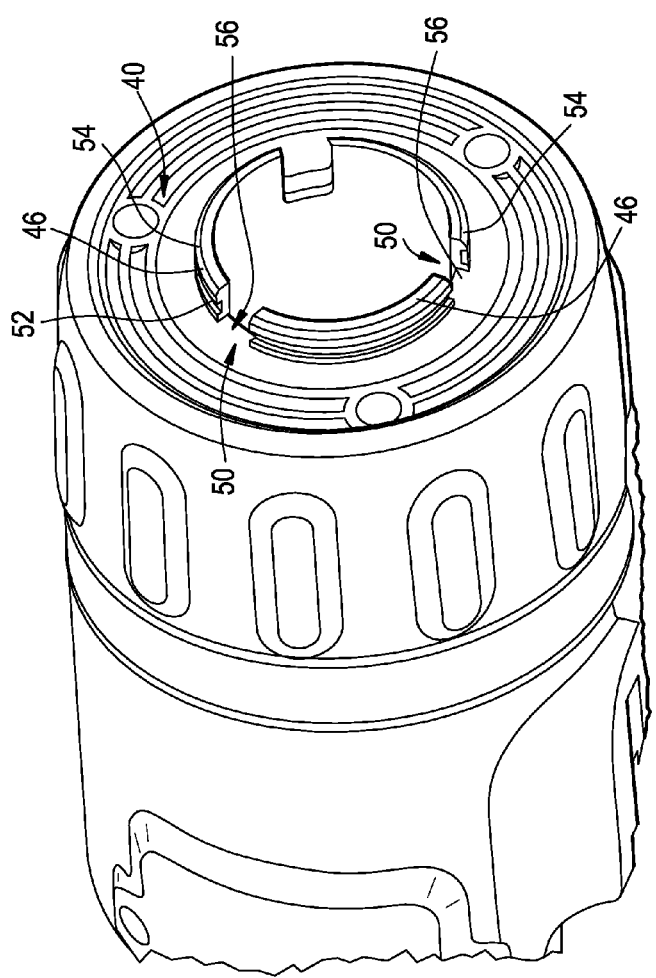
FIG. 4 is a perspective view similar to that shown in FIG. 3 with a retaining ring removed in order to more clearly show surrounding elements.

FIG. 4 is a similar view as that shown in FIG. 3, however, the retaining ring 44 has been removed as well as the end effector 28 to better illustrate features of the lens cover 40 and the retainer 46. The lens cover 40 includes tabs 56 which are located within the gaps 50 of the retainer 46. The tab 56 and gap 50 combination keep the lens cover 40 aligned and from rotating around the retainer 46. The groove 52 is also illustrated in FIG. 4 in which the retaining ring 44 is located as shown in FIG. 3.

FIG. 5 illustrates other aspects of the light ring 38 which are normally contained within the clutch collar 34 and located behind the lens cover 40. As part of the light ring 38, light emitting diodes or LEDs 58 are located at various points around the light ring 38. In some embodiments in accordance with the invention, the LEDs 58 emit white light although in other embodiments the LEDs 58 might emit other colors of light. In some embodiments different LEDs on the same tool could emit different colors of light. While the embodiment shown in FIG. 5 illustrates three LEDs 58 any number of LEDs may be used in accordance with the invention including one or more.

The LEDs 58 are mounted to a ring-shaped printed circuit board or PCB 60. The PCB 60 and LEDs 58 are fit into a trench 61 in the wire way 62. The wire way 62 and trench 61 may allow for potting of the PCB if necessary. The wire way 62 provides protection and structural strength for the PCB so that undue mechanical loads are not placed upon the PCB 60. Such support is desirable as a PCB 60 may be fragile and subject to breaking or malfunctioning. The wire way 62 may include snap-in features 64 which allow the PCB 60 to be pushed into the wire way 62 and then the snap-in features 64 snap out once the PCB 60 is located within the wire way 62. The snap-in features 64 prevent the PCB 60 from coming out of the wire way 62.

The wire way 62 may include grooves 66. Tabs 68 located on the PCB 62 may fit within the grooves 66 within the wire way 62. The tabs 68 and grooves 66 combination help the PCB 60 and the wire way 62 be aligned and may prevent or resist the PCB 60 from rotating with respect to the wire way 62.

The wire way 62 may include a PCB holding portion 70 which is generally circular in shape and a wire supporting portion 72. The wire supporting portion 72 may include a channel 74 which is sized and located to contain wires 76. The wires 76 may provide power to the PCB 60 which in turns provides power to illuminate the LEDs 58. The wire supporting portion 72 of the wire way 62 provides a structure for the wires 76 to be supported in and provides protection for the wires 76. The wires 76 may terminate with a plug 78. The plug 78 may fit into plug supporting structure 80 located within the wire supporting portion 72 so that the plug 78, which is made of a more rigid material than the wires 76, is held securely to the wire way 62 via the plug supporting structure 80. In some embodiments, the plug 78 may be press fit into the wire supporting portion 72 of the wire way 62. The circuit to which the PCB 60 is connected may also include an electromagnetic surge suppression circuit (such as a zener diode) for static and over-voltage protection. The circuit may also include a resistor or resistors to drop the voltage from the battery pack voltage to an appropriate level for the LEDs.

Some embodiments do not have a separate PCB, wire guide, wires and connector. For example, plated plastics can be used whereby the wire guide could be first molded into a shape similar to the wire guide 62 as shown. Secondly, tracks (like on a standard PCB) could be created on this plastic piece, and could include all of the pads to mount LEDs and other components, the tracks, or "wires," from the front of the tool back to the connector area, and could even include the male end of the connector. The components (diodes, resistors, etc.) could then be soldered to this one piece, and would be electrically connected back to the place where the wires would connect it to the switch. This would greatly simplify the assembly.

Figure 6:
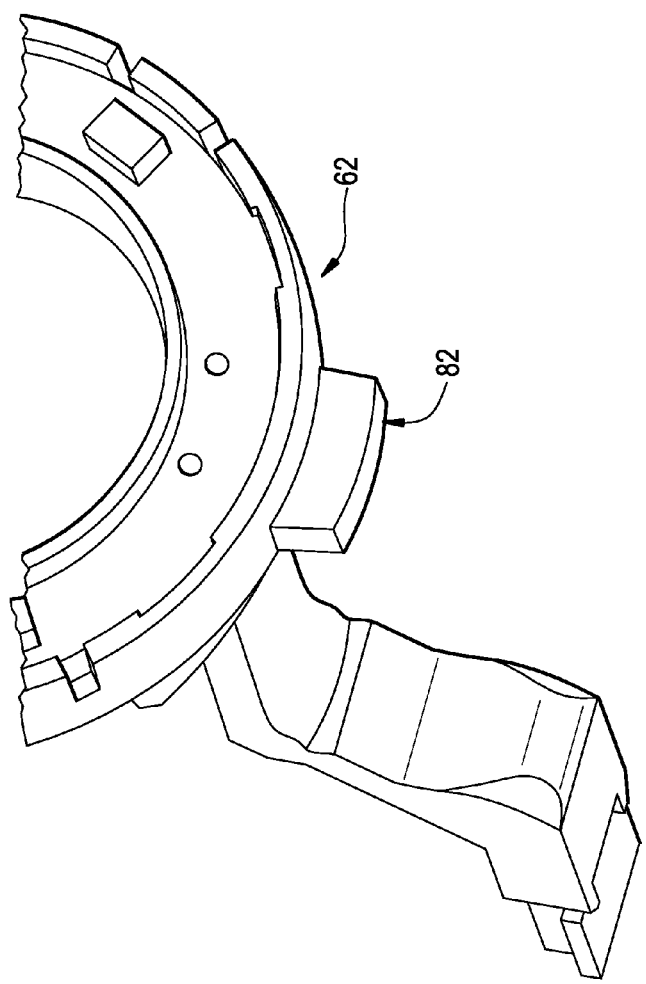
FIG. 6 is a partial perspective view of a bottom portion of the wire guide and PCB.
Figure 12:
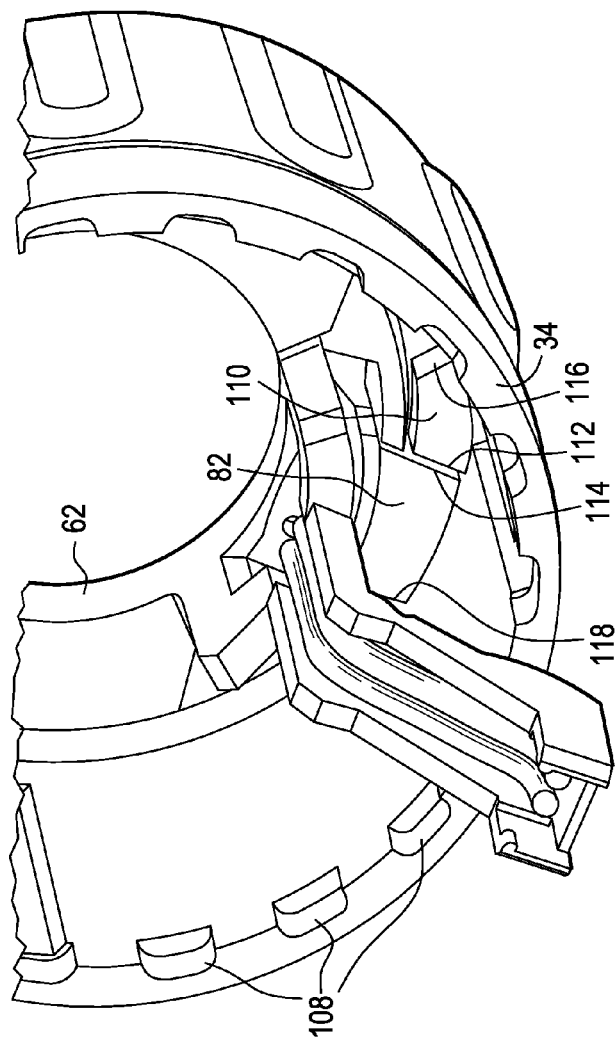
FIG. 12 is a partial rear perspective view of the wire guide mounted on the clutch collar.

FIG. 6 is a partial perspective view of a bottom portion of the wire way 62. The wire way 62 may be equipped with a collar stopping tab 82 which will be explained in more detail below as FIG. 12 is discussed.

Figure 7:
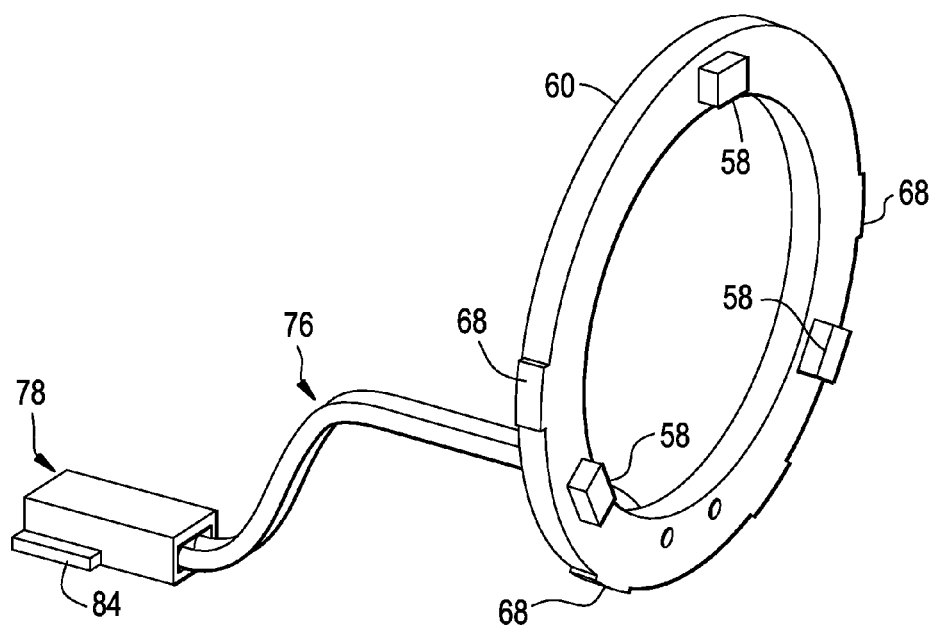
FIG. 7 is a perspective view of the PCB and wires with the wire guide removed.

FIG. 7 is a perspective view similar to that shown in FIG. 5, however, the wire way 62 has been removed in order to better illustrate some of the features shown in FIG. 7. The LEDs 58 are mounted onto the PCB 60. The PCB 60 shows the tabs 68. While the embodiments shown in the figures show five tabs 68, one skilled in the art can appreciate that other numbers of tabs or other features may be employed in order to help keep the PCB aligned and/or rotationally locked to the wire way 68.

The wires 76 are attached to a rear portion of the PCB 60. The plug 78 includes the plug stopping structure 84 which butts against a portion of the wire way 68 to prevent the plug 78 from being inserted too far into the wire way 62.

Figure 8:
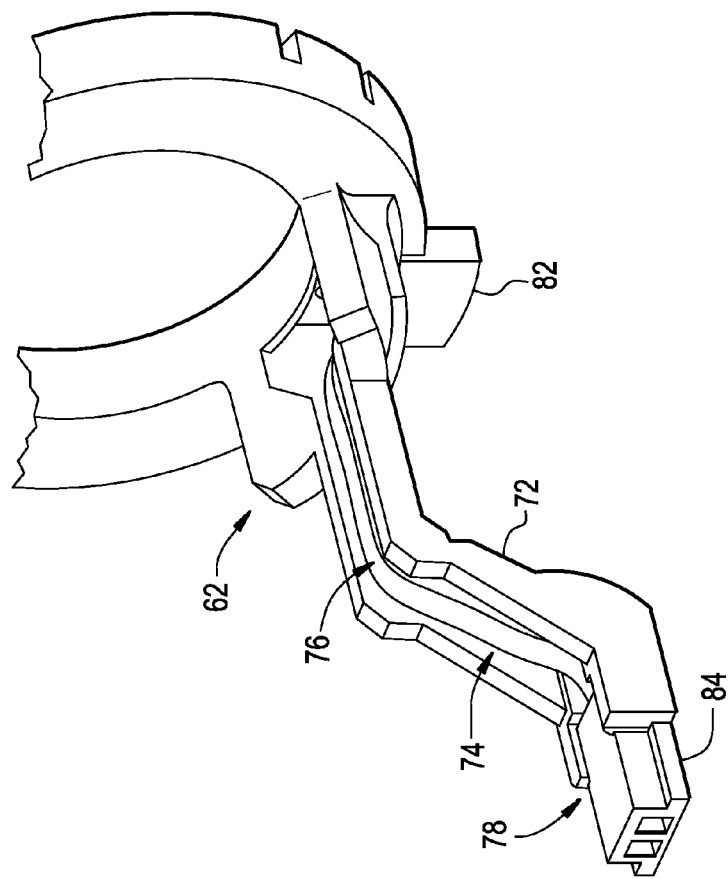
FIG. 8 is a partial perspective rear view of the wire guide, PCB, and wires.

FIG. 8 illustrates the plug stopping structure 84 located on the plug 78 butted against the wire supporting portion 72 of the wire way 62. The wires 76 are located within the channel 74. In some embodiments, the plug 78 snaps into the wire supporting portion 72 and the wires 76 may be pressed into the channel 74 in a press fit manner to secure the wires 76 into the channel 74. A rear portion of the collar stopping tab 82 is also illustrated in FIG. 8.

Figure 9:
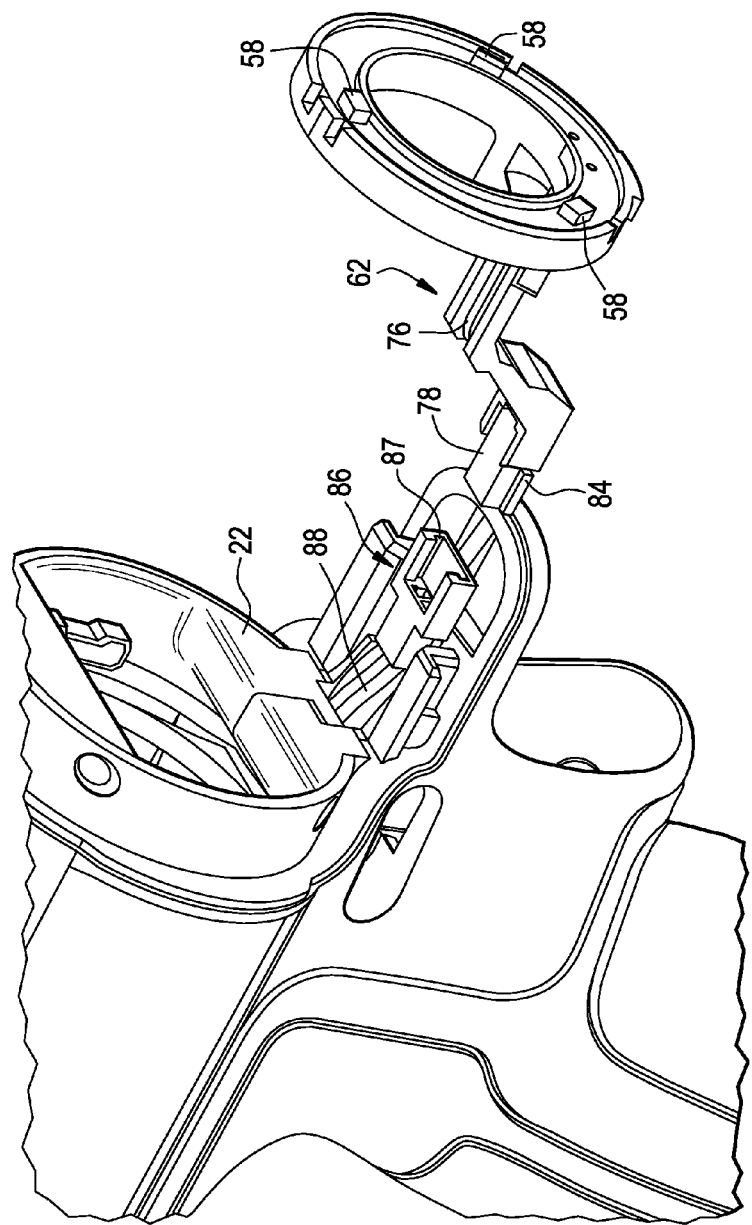
FIG. 9 is a partial exploded perspective view of the wire guide and a power tool having some elements removed to better show other elements.

FIG. 9 illustrates the housing 22 and the wire way 62. The nose cone 23 has been removed in order to better illustrate how the plug 78 attaches to a receiving plug 86. The plug 78 is slid into the receiving plug 76. The plug stopping structure 84 slides into slots 87 located on the receiving plug 86. Once the plug 78 and the receiving plug 86 have been mated together, power from the wires 88 is communicated to the wire 76. The joint made of the plug 78 and the receiving plug 86 provide a rigid support for the connection of the wires 76 and 88. The wires 88 may receive power from the battery 26 as controlled by the trigger 30. In some embodiments the wires 88 extend out of a switch body associated with the trigger 30. In other embodiments, a switch body could have connectors to which the wires 88 are soldered or otherwise connected. The trigger switch may include electronics for variable speed control. The wires 88 may be soldered to a PCB located inside the switch body.

In accordance with some embodiments of the invention, when the trigger 30, as shown in FIG. 1, is depressed, power is sent to the wires 88 and in turn 76 to illuminate the LEDs.

Figure 10:
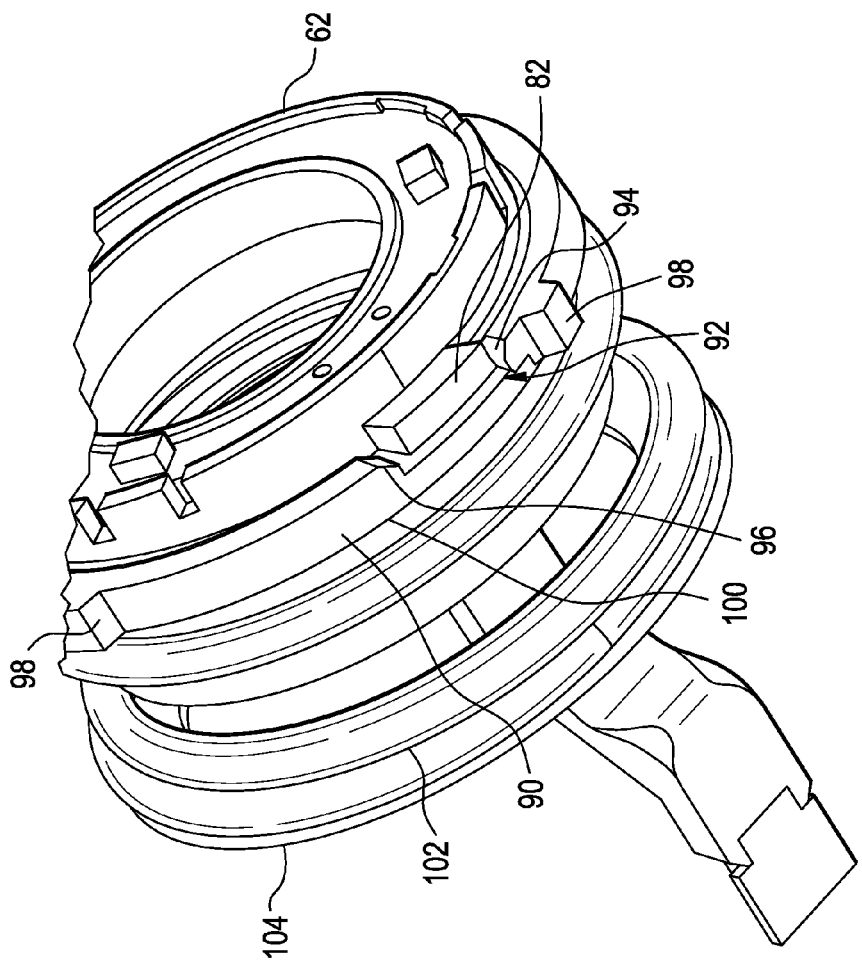
FIG. 10 is a partial perspective view of a wire guide, clutch adjusting nut, clutch spring, and clutch washer mounted on the wire guide.

FIG. 10 is a partial perspective view of the guide 62 showing several additional elements on the guide 62. A clutch adjusting nut 90 is butted against the guide 62. The stop tab 82 is fit into a notch 92 in the clutch adjusting nut 90. The notch 92 in the clutch adjusting nut 90 aligns to the stopping tab 82 on the guide 62 to assist in providing proper assembly of the threads between the adjusting nut 90 and the nose cone 23 during assembly. In some embodiments and as shown in FIG. 10, the notch 92 and the clutch adjusting nut 90 may have chamfered edges 96 to the notch walls 94. The chamfered edges 96 may assist in the stopping tab 82 to be seated in the notch 92 and the clutch adjusting nut 90.

According to some embodiments, a combination of the notch 92 and the clutch adjusting nut 70 and the stopping tab 82 in combination with the other tabs and notch combinations 50, 56, 66, 68 can assure that the lens cover 40, the nose cone 23, the wire way 62, the PCB 60, and the clutch adjusting nut 90 are aligned with respect to each other.

Figure 11:
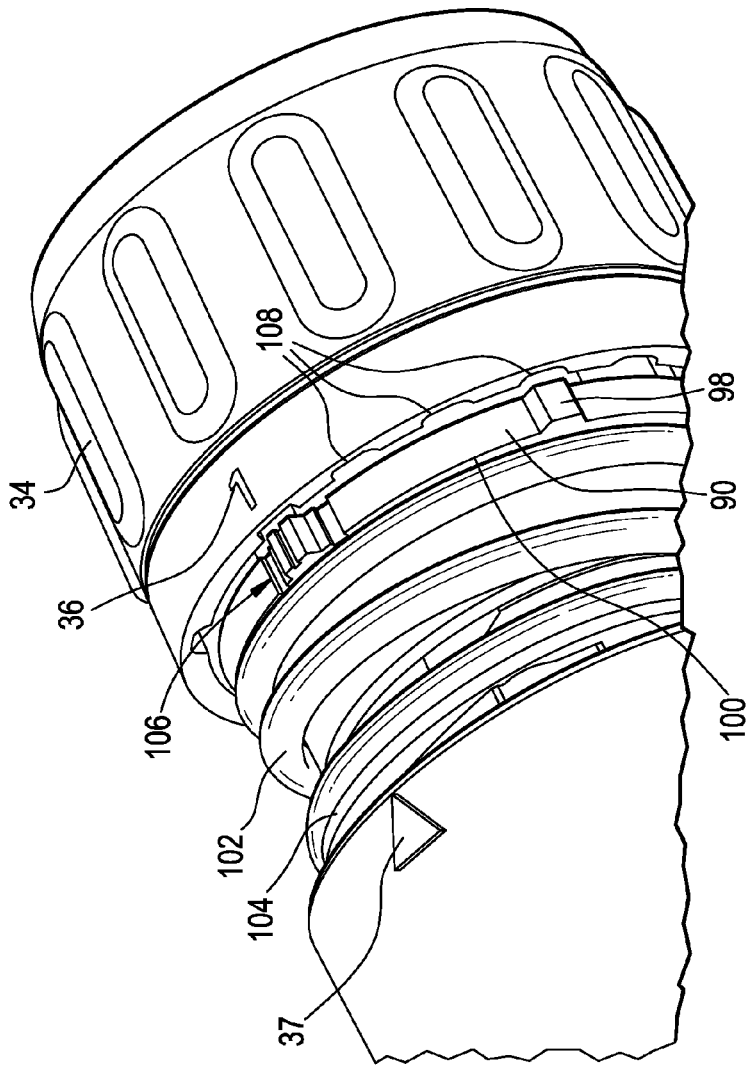
FIG. 11 is a partial perspective view of a power tool and clutch collar where the clutch collar is shown in a forward position to illustrate the clutch adjusting nut, clutch spring, and clutch washer mounted to the nose cone.

The clutch adjusting nut 90 includes a ridge 100. As shown in FIG. 10 a clutch spring 102 urges at one end against the ridge 100 and at the opposite end of the clutch spring 102, the clutch spring 102 urges against a clutch washer 104. The clutch spring 102 exerts a force on the ridge 100 of the clutch adjusting nut 90 which in turn urges the wire way 62 against the lens cover 40 and ultimately against the retaining ring 44. The force exerted by the clutch spring 102 keeps the light ring assembly 38 in axial position. As shown in FIG. 11 the clutch washer 104 urges against the nose cone 23.

FIG. 11 illustrates the clutch washer 104, clutch spring 102, and the clutch adjusting nut 90 mounted to the nose cone 23. The clutch collar 34 is shown in a forward axial position and not yet installed on the power tool 20 in order to expose the clutch washer 104, the clutch spring 102 and the clutch adjusting nut 90.

To provide ease in the assembly of the power tool 20, a tab 98 on the clutch adjusting nut 90 is scored with marks or notches 106 on one of the adjustment tabs 98. The scoring 106 provides a visual aid when assembling the collar 34 to properly align the clutch collar 34. The adjustment tab 98 on the clutch adjusting nut 90 is aligned with a desired notch 108 in the clutch collar 34. Once the desired notch 108 is aligned with the desired adjustment tab 98, the clutch collar 34 can be fitted onto the power tool 20. In some embodiments, the indicator 34 and the numbered scale 36 may also provide assistance in aligning the clutch collar 34 to provide proper assembly of the clutch collar 34 onto the nose cone 23.

FIG. 12 is a partial perspective view of the clutch collar 34 installed onto the guide 62. Other elements have been omitted from FIG. 12 in order to better show the interaction between the guide 62 and the clutch collar 34. The clutch collar 34, in some embodiments in accordance with the invention, is rotatable. The clutch collar 34 is rotatable on the power tool 20 in order to provide different torque and/or speed settings for the end effector 28. It may be desirable to limit the rotation of the clutch collar 34 in both directions to establish a maximum setting for turning the clutch collar clockwise and a maximum setting when turning the clutch collar counterclockwise as shown in FIG. 12. Making maximum and minimum settings is, in some embodiments, accomplished by using the collar stopping tab 82 which butts against the stop 110 on the clutch collar 34. The wall 112 on the stop 110 butts against a wall 114 on the collar stopping tab 82 to provide a limit to clutch collar 34 rotation in a clockwise direction as viewed in FIG. 12. The same stop 110 and collar stopping tab 82 provide a stop for rotating the clutch collar 34 in the opposite direction (i.e., counterclockwise as viewed in FIG. 12). This is accomplished when the clutch collar 34 is rotated so that the opposite wall 116 on the stop 110 butts against the opposite wall 118 on the tab 82.

FIG. 12 also illustrates additional notches 108 in the clutch collar 34 for providing detents when the clutch collar 34 is rotated to various settings with respect to the nose cone 23.

Figure 13:
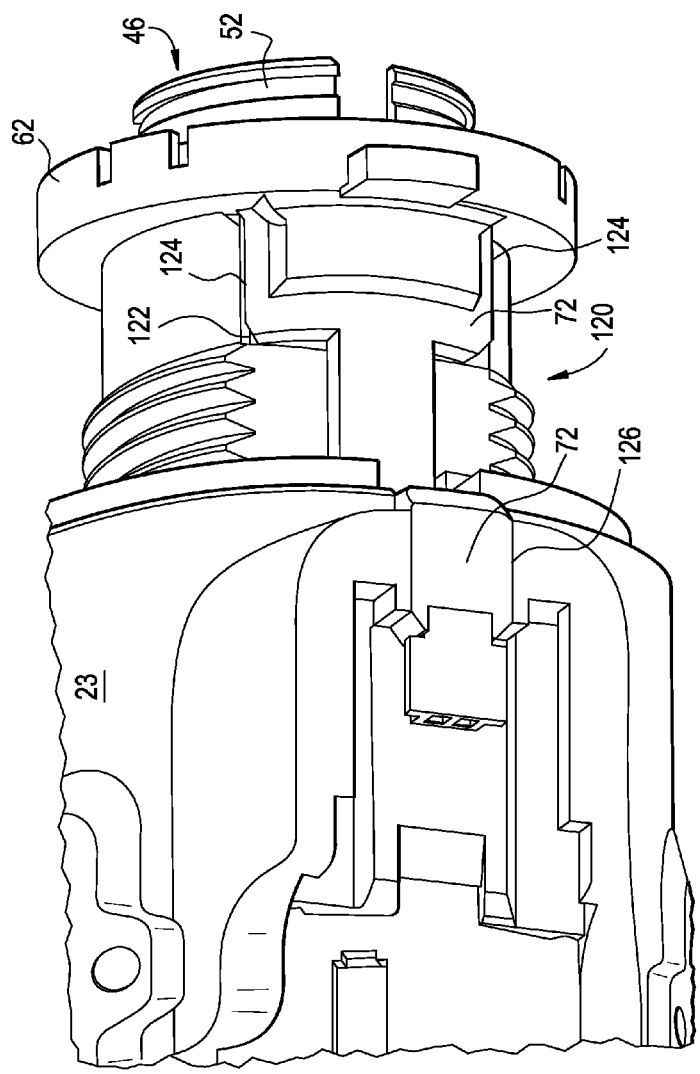
FIG. 13 is a partial perspective view of the wire guide mounted onto the nose cone.

FIG. 13 is a partial perspective view of the guide 62 mounted onto a stem portion 120 of the nose cone 23. A lock portion 124 of the guide 62 fits into a groove 122 of the stem portion 120 of the nose cone 23. The groove 122 is sized and dimensioned so that the lock portion 124 of the wire supporting portion 72 of the guide 62 fits within the groove 122 and locks the guide 62 to be angularly fixed with respect to the nose cone 23. The locks 124 located on the wire supporting portion 72 of the guide 62 are wider than the rest of the wire supporting portion 72 and aid in permitting the guide 62 to be securely seated in the groove 122 of the stem portion 120 of the nose cone 23.

A second groove 126 is in the nose cone 23 for allowing the wire supporting portion 72 of the guide 62 to fit within the groove 126 of the nose cone 23. The retainer 46 on the nose cone 23 and the groove 52 of the nose cone 23 are also shown forward of the guide 62. The above described features also help align the guide 62 with respect to the nose cone 23.

According to some embodiments, the retainer 46 is integral with the stem 120 and the nose cone 23. In other embodiments of the inventions, they may be separable parts.

Figure 14:
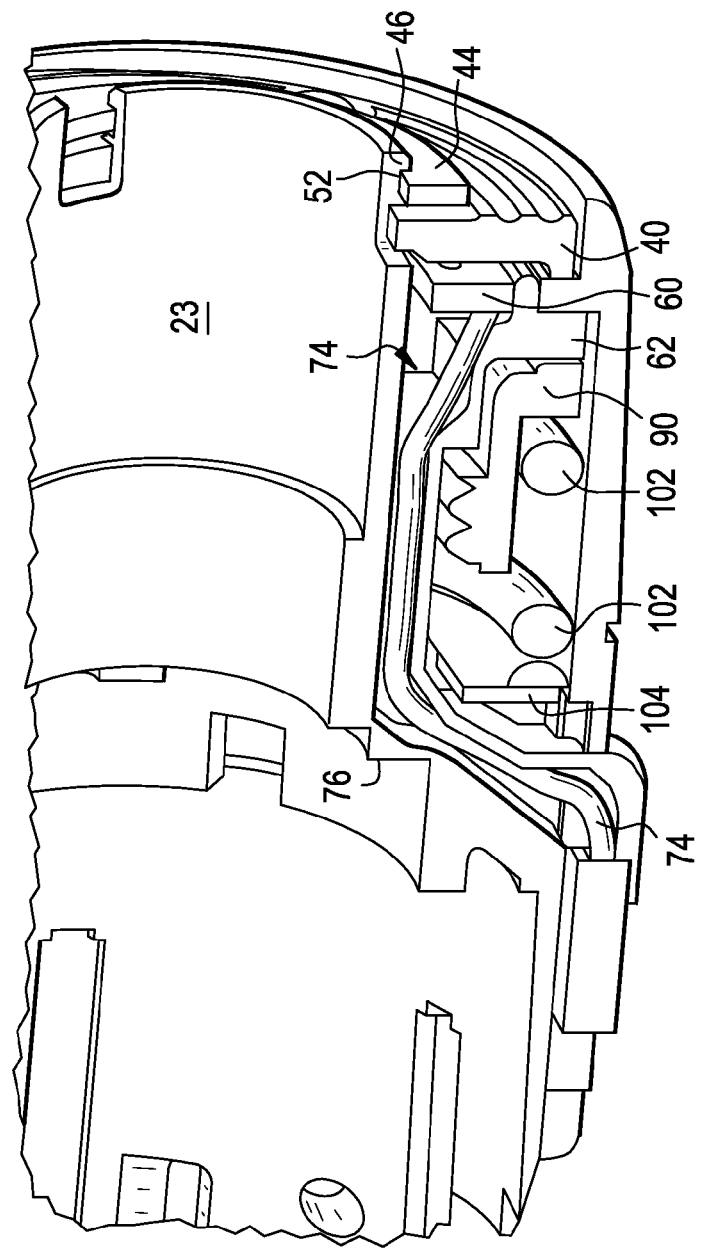
FIG. 14 is a partial cutaway perspective view of a nose cone as well as other elements mounted to the nose cone. The end effector and power transmission elements are removed for clarity.

FIG. 14 is a partial cutaway perspective view of the nose cone 23 and additional parts described below. FIG. 14 shows how the parts described herein are assembled together according to some embodiments of the invention. The transmission, spindle, and other parts associated with turning the end effector have been omitted to more clearly show the parts described herein. The retaining ring 44 is seated within the groove 52 of the retainer 46. The retaining ring 44 provides a limit of forward axial movement of the lens cover 40, the guide 62, and the clutch adjusting nut 90. The clutch spring 102 presses against the clutch washer 104 to urge the clutch adjusting nut 90 to urge the guide 62, PCB 60, and lens cover 40 against the retaining ring 44. The wires 76 are located in a channel 74 defined by the guide 62 and the nose cone 23. The wires 76 are protected from the spinning parts of the end effector mechanism.

Although an example of the light ring 38 is shown on a power driver, it will be appreciated that the light ring 38 can be used on other rotary power tools such as impact drivers, drills, hammer drills, routers.

Referring to FIGS. 15-24, in another embodiment, a light ring 138 is mounted on a different power tool 147 than shown in FIGS. 1-14. The power tool 147 is not equipped with a rotatable collar as described in the embodiments above. A holder 140 configured to be used with the power tool 147 holds the light ring 138. The light ring 138 includes a generally circular PCB 160 similar to the PCB 60 described above. The PCB 160 and the holder 140 may include snap-in features similar to the snap-in features 64 described above, so that the PCB 160 snaps into and is secured in the holder 140.

A circular lens cover 162 may be mounted to the holder 140 in front of the PCB 160 similar to embodiments described above. The lens cover 162 may include snap-in elements that correspond with snap-in elements on the holder 140. In other embodiments in accordance with the invention, the lens 40 may be secured in place with a retaining ring system similar to that described above.

The holder 140 may attach to a transmission housing 123 of the power tool 147 with snap-in elements located on both the holder 140 and the transmission housing 123 similar to the snap-in features described in the embodiments above. In other embodiments in accordance with the invention, the light ring holder 140 may be secured in place in a variety of ways including, but not limited to, a retaining ring system similar to the embodiments described above.

The holder 140 includes a housing portion 142, a chin shroud 144, and a wire way portion 146. Wires 176 (similar to wires 76 described above) connect the PCB 160 (which carries light emitting elements similar to those described above) with a plug 178 (similar to the plug 78 described above). In contrast to the wire way 62 described above, the holder 140 does not fully support the wires 176 along the full length of the wires 176 all the way to the plug 178. Rather, the wire way portion 146 stops at some point along the length of the wires 176, leaving the wires 176 and the plug 178 to be not supported by the holder 140.

Figure 15:
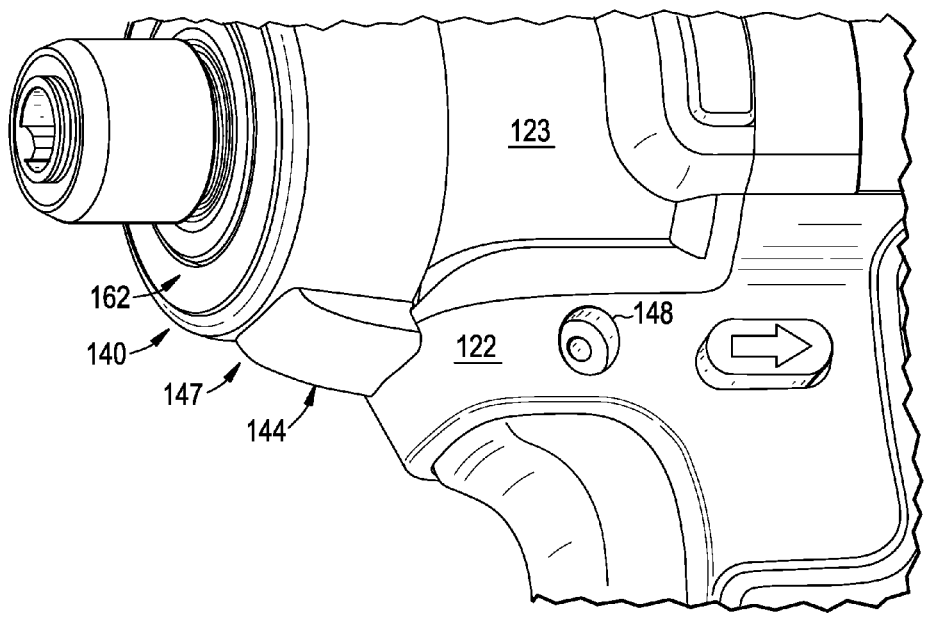
FIG. 15 is a partial perspective view of a power tool equipped with a holder in accordance with another embodiment of the invention.

As shown in FIG. 15, the lens cover 162 is shown mounted in a recess in the holder 140. The holder 140 is mounted to the transmission housing 123 which is supported by a housing 122 of the power tool 147. A fastener hole 148 is shown in the housing 122. The fastener hole 148 provides a place for a fastener such as a screw or bolt to connect the two halves of the clam shell type housing 122 together. While the fastener is not shown in FIG. 16, it will be appreciated that when the power tool 147 is fully constructed that a fastener will be located in the fastener hole 148 to connect the two halves of the clam shell housing 122 together. Other embodiments of the invention may connect the clamshells of the housing 122 in other ways. Some embodiments of the invention may include one piece housings or other types of housings than the clam shell housing shown in FIG. 16. The chin shroud 144 is located on the holder 140 and provides a housing for a portion of the wires 176 so that the wires 176 are not exposed outside of the power tool 147.

Figure 16:
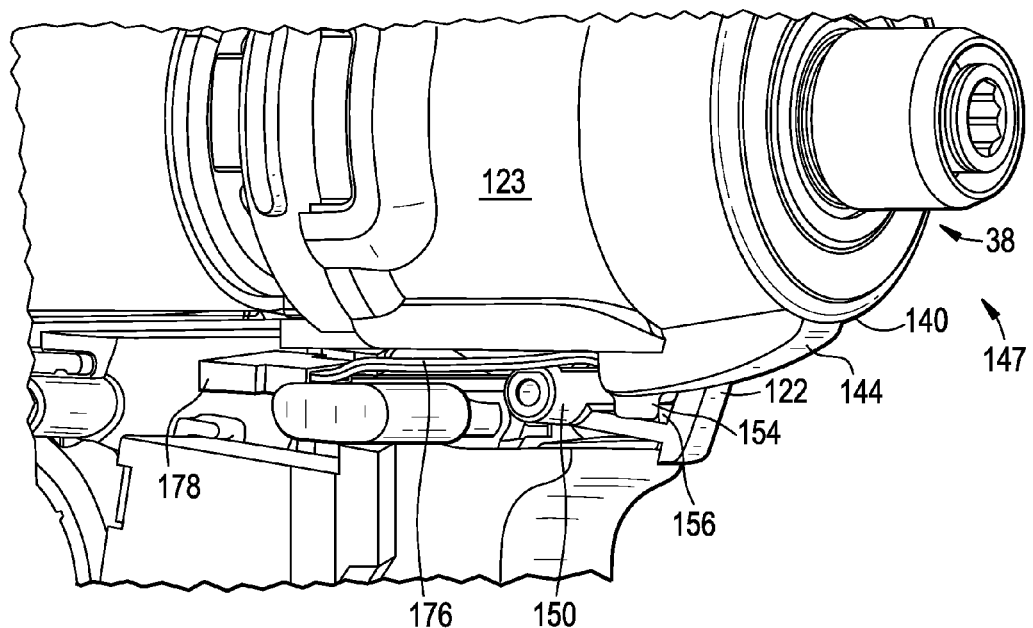
FIG. 16 is a partial perspective view with part of the housing removed of a power tool equipped with a holder similar to that shown in FIG. 15.
Figure 17:
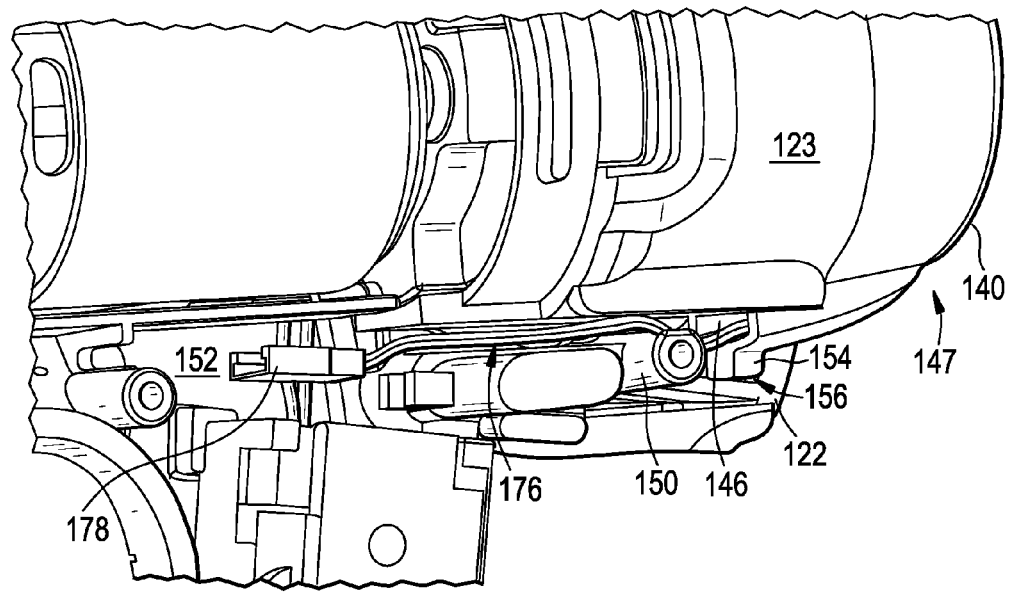
FIG. 17 is a partial perspective view of a power tool with part of the housing removed to expose interior components.

FIGS. 16 and 17 show the power tool 147 with part of the housing 122 removed. The housing 122 is a clam shell type housing and one of the clam shells is removed exposing the clam shell housing 122 located on the far side of the power tool 147. The holder 140 is shown mounted to the transmission housing 123. A fastener hole tube 150 located in the fastener hole 148 is shown. The wires 176 are routed around the hole tube 150 and are located in the interior 152 of the housing 122. The wires 176 are terminated with a plug 178 also located in the interior 152 of the housing 122.

The interior 152 of the housing defines a space or pathway for the wires 176 and the plug 178. The chin shroud 144 defines a wire way portion 146 through which the wires 176 are strung. The chin shroud 144 also includes retaining structure 154 which is set in a retaining area 156 defined by the housing 122. When the two clam shells of the clam shell housing 122 are mounted together and fastened together with a fastener located in the fastener hole 148 and fastener hole tube 150, the retaining structure 154 on the chin shroud 144 is trapped in the retaining area 156 thereby holding the chin shroud 144 and holder 140 in place on the power tool 147. Operation of the light ring 138 is similar to that described in the embodiments above.

Figure 18:
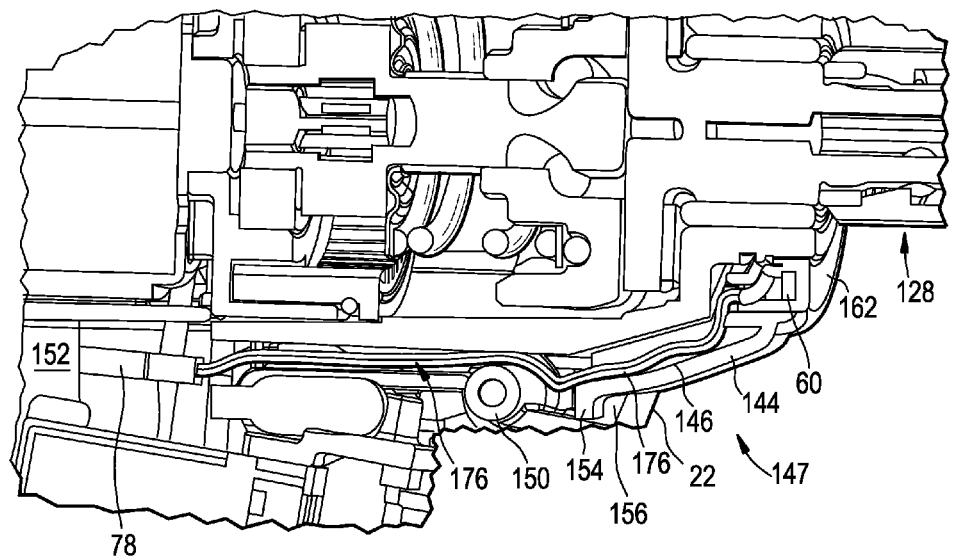
FIG. 18 is a partial perspective cut-away view of a power tool equipped with a holder similar to that shown in FIG. 15. The cut-away view illustrates some of the internal components of the power tool.

FIG. 18 is a partial perspective cut-away view showing an end effector 128 associated with the power tool 147 extending through the lens cover 162 located in front of the PCB 160. As described above, LEDs 184 (not shown in FIG. 18) are located on the PCB 160 and configured to light the tool or workpiece being worked on by the power tool 147. The wires 176 provide power between the PCB 160 and a power source connected via the plug 178 to power source. The wires 176 are located in the wire way portion 146 of the chin shroud 144 and the interior 152 of the housing 122. The chin shroud 144 has the retaining structure 154 located in the retaining area 156 defined by the housing 122.

Figure 19:
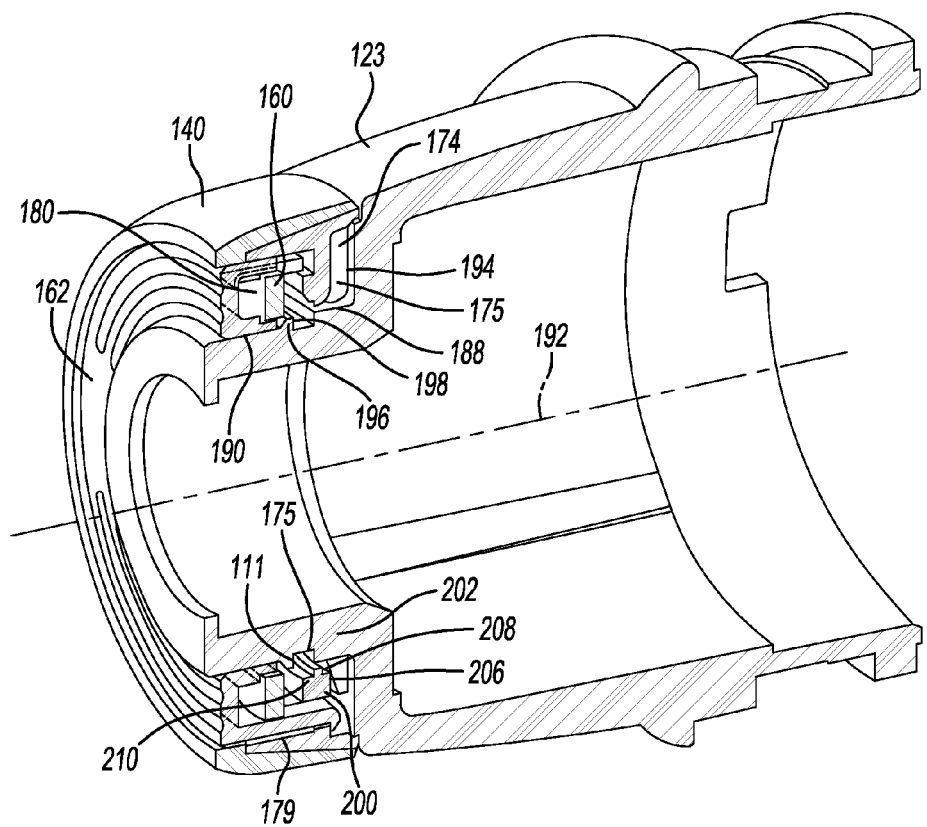
FIG. 19 represents a cross-sectional view of a holder subassembly associated with the nosepiece shown in FIG. 15.

FIG. 19 represents a cross-sectional view of the holder 140 and transmission housing 123 subassembly. The holder 140 can be coupled to the transmission housing 123 using a plurality of snap features, or bayonet mechanisms 174 which are configured to interface with a corresponding L-shaped channel 175 defined within the transmission housing 123. Disposed within a channel 179 defined by the holder 140 is the transparent cover 162. As described below, the transparent cover 162 itself defines a transparent cover channel 180 which annularly supports an associated printed circuit board 160 having a plurality of surface mounted light emitting diodes (LEDS) 184. As described in detail below, the circuit board 182 is held into the transparent cover channel 180 using a locking member 186 which is heat staked to the circuit board 160 to effect a solid non-rotatable fixation of the circuit board 160 to the transmission housing 123.

The holder 140 is coupled to a stepped portion 188 of the transmission housing 123. The stepped portion 188 has a first surface 190 which is generally parallel to a centerline 192 of the tool 147. Generally perpendicular to this surface is a second surface 194 which acts as an abutment for the holder 140. The first surface 190 of the stepped portion 188 has a protruding flange 196 which functions as a locking feature to couple the holder 140 into the stepped portion 188. The flange 196 has a ramped surface 198 which facilitates the snapping of a corresponding locking feature 200 on the holder 140 onto the stepped portion 188. Defined within a second portion 202 the first surface 190 comprises the locking groove or channel 175. The locking groove 175 is annularly formed within the second portion 202 or can be formed of a plurality of radially disposed intermittent coupling grooves. The locking feature 174 comprises a chamfered flange member 206 having a ramped interfaced surface 208 and opposed planar bearing surface 210. The planar bearing surface 210 is configured to interface with a corresponding planar bearing surface 211 defined either on the flange 196 or locking groove or channel 175 defined within second portion 202 of the first surface 190.

Figure 20:
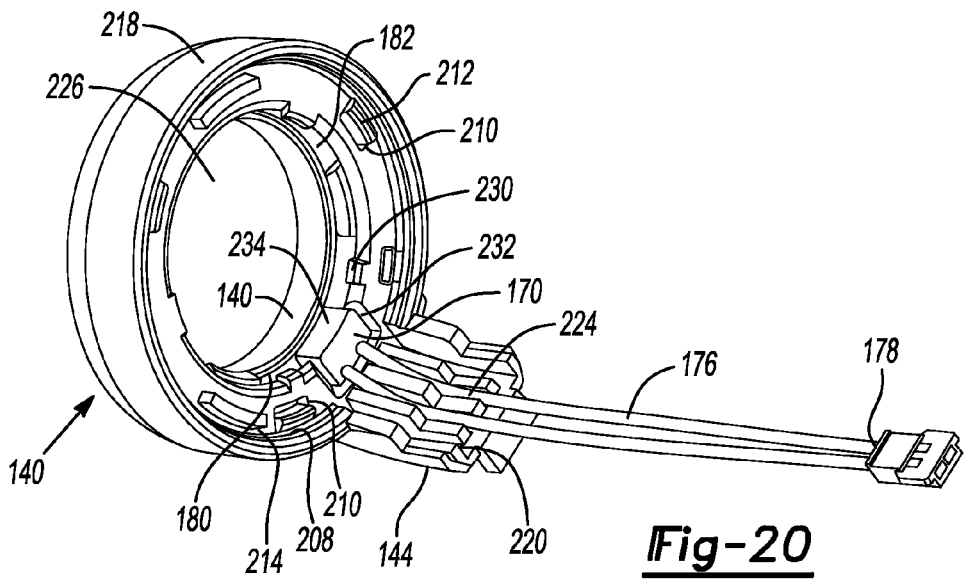
FIG. 20 represents a perspective cross-sectional view of the holder subassembly shown in FIG. 15.

FIG. 20 represents a perspective view of the holder 140 in subassembly form. The holder 140 contains a mounting member 208 which defines a plurality of radially disposed coupling slots 210. The slots 210 are configured to accept a corresponding set of transparent cover snap coupling members 212. The snap coupling members 212 are configured to bear against an inner surface 214 of the mounting member 208. Protruding from the inner surface 214 are three depending coupling flanges which are configured to couple the holder 140 to the transmission housing 123.

The holder 140 has a generally cylindrical exterior surface 218. The exterior surface 218 functions to encapsulate the transparent cover 162, mounting member 208 and circuit board 160. The mounting member 208 has a depending wire support member 220 having a center flanged portion 222 which defines a pair of generally elongated wire bearing slots 224. The slots are configured to accept the pair of power wires 176 from the wire harness pig tail assembly. The wire support member 220 is generally disposed within the chin shroud 144 and facilitates the protection of the light source power wires. The mounting member 208 defines an axial through bore 226. The through bore 226 has an inner surface 228 with a plurality of associated stand off flanges 230. The stand off flanges 230 function to apply pressure onto the circuit board 160 when the mounting member is engaged with the holder 140. Further defined within the inner surface 228 is a notch 232 configured to accept a wire harness strain relief member 234. The wire harness strain relief member 234 has a pair of curved internal surfaces which accept the bent wires 176 in a manner to minimize the overall axial length of the holder 140.

Figure 21:
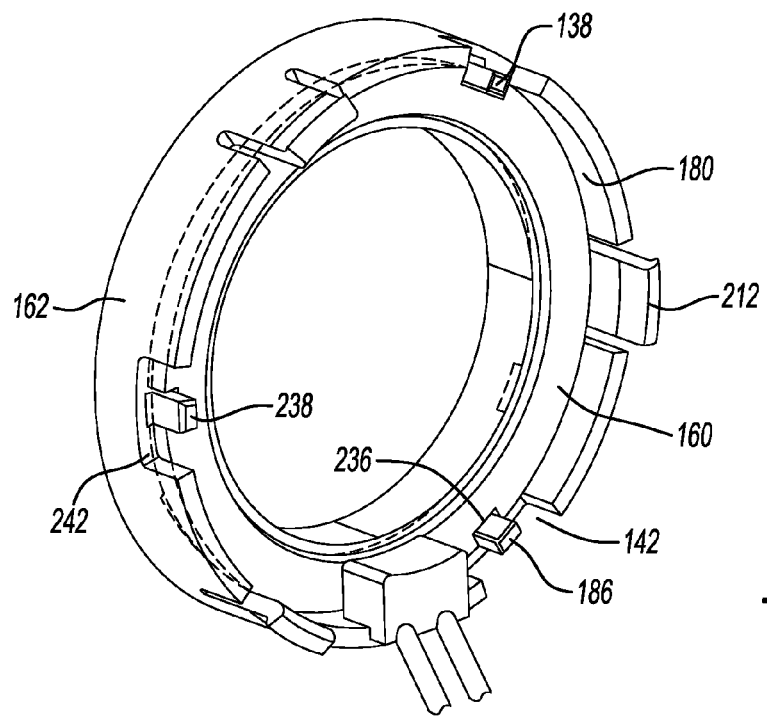
FIG. 21 represents a perspective view of a transparent cover-circuit board in the embodiment of FIG. 15.

FIG. 21 represents a rear perspective view of the transparent cover 162 and circuit board 160 subassembly. As shown, the circuit board 160 is generally circular and is disposed within the transparent cover channel 180. The circuit board 160 defines a plurality of radially disposed notches 236 on the exterior radial periphery of the circuit board. The notches 236 accept corresponding flanges 286 which are defined radially within an inner bearing surface 240 of the transparent cover channel 180. Defined within the transparent cover and adjacent to the flanges 238 are corresponding notches 242 which have a depth generally corresponding to the locational position of the circuit board 160. After the circuit board 160 is placed within the channel 180, the flanges 238 are melted, thereby fixably coupling the circuit board 282 within the transparent cover 162 using a heat staking process.

The couplers or attachment mechanisms between the circuit board 160 and the transparent cover 162, the holder 140 and the transmission housing 123, or the holder 140 and the transparent cover 162 can take the form of a heat stake joint, a bayonet joint, or a locking flange within a slot, exemplary embodiments of which are described above. The couplers or attachment mechanisms are configured to withstand the extreme cyclic torsional loading associated with hand held power tools. In this regard, the joints are configured to prevent vibrational noise or damage to these components, especially to the PCB.

Figure 22:
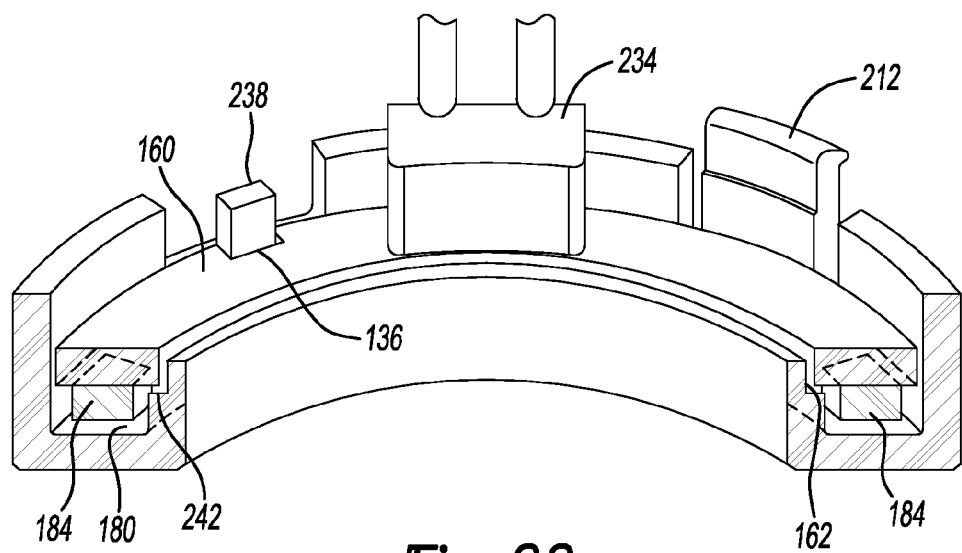
FIG. 22 represents a perspective cross-sectional view of the transparent circuit board subassembly shown in FIG. 21.
Figure 23:
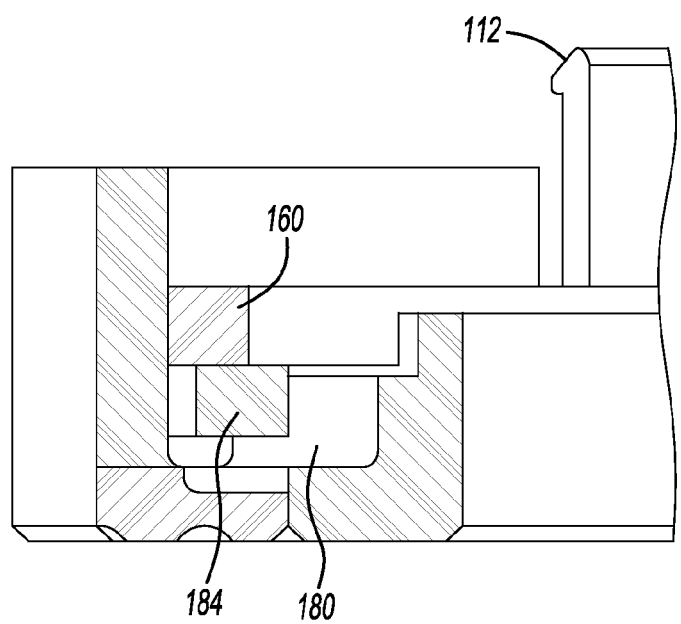
FIG. 23 represents a partial front perspective view of the subassembly shown in FIG. 21.

FIGS. 22 and 23 represent cross-sectional perspective views of the subassembly shown in FIG. 21. Shown is the transparent cover channel 180, a coupling flange 238, relief member 234 and snap member 212. The channel 180 defines an inner ledge 242 which axially supports the circuit board 160 in a position which axially locates the LEDs 184 at the proper distance from the transparent cover 162. The distance allows for the proper focusing of the light from the LEDs on to a workpiece.

Figure 24:
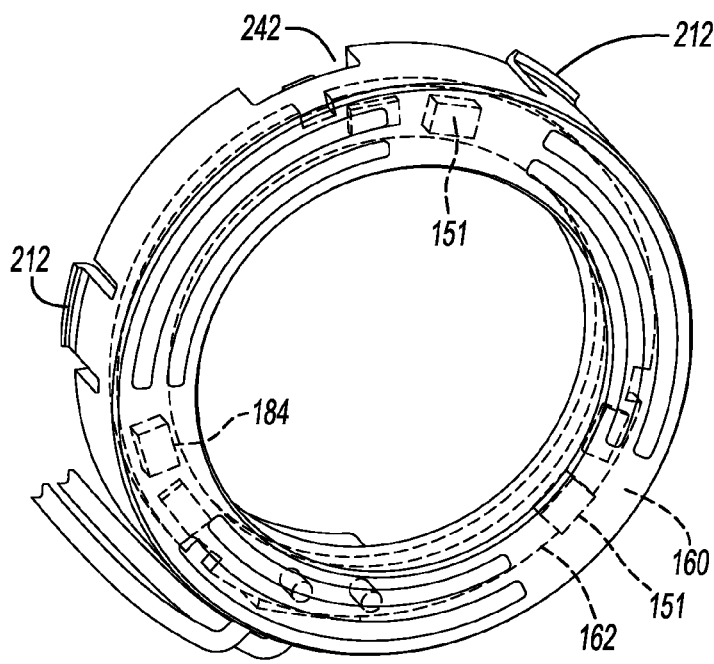
FIG. 24 represents a close-up view of the circuit board/transparent housing interface of the subassembly shown in FIG. 15.

FIG. 24 represents a front view of the transparent cover/circuit board subassembly shown in FIGS. 21 and 22. Shown is the positional position of the LEDs 184 with respect to the various snap and coupling features. While surface mounted LEDs 184 are shown and have their own particular advantages, it should be envisioned that non-surface mount LEDs could be used. Shown adjacent to the LEDs 184 is a plurality of surface mounted resistors 151 which are electrically coupled to the LEDs 184.

Figure 25:
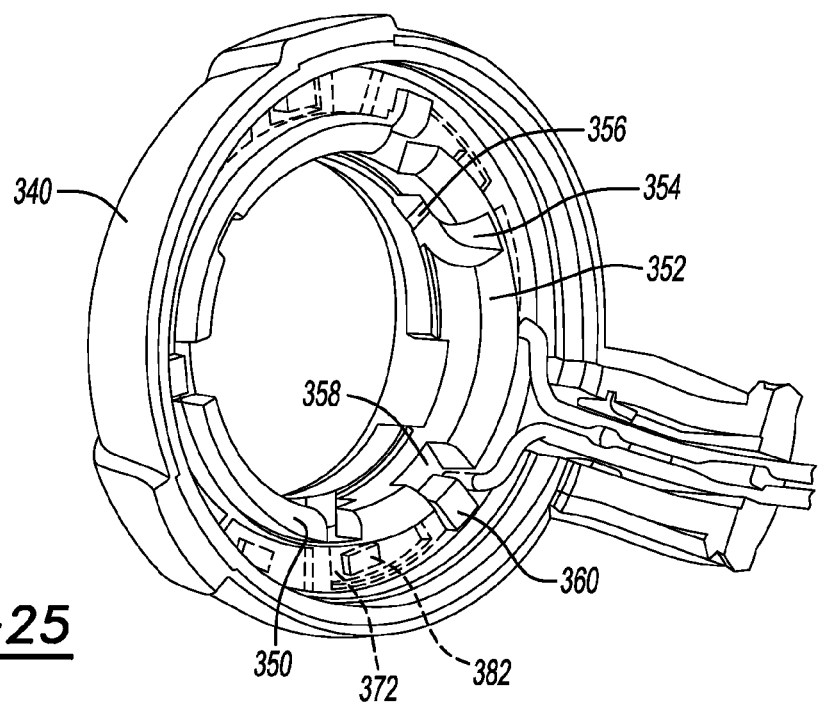
FIG. 25 represents a rear perspective view of an alternate holder subassembly for use with the power tool shown in FIG. 15.
Figure 26:
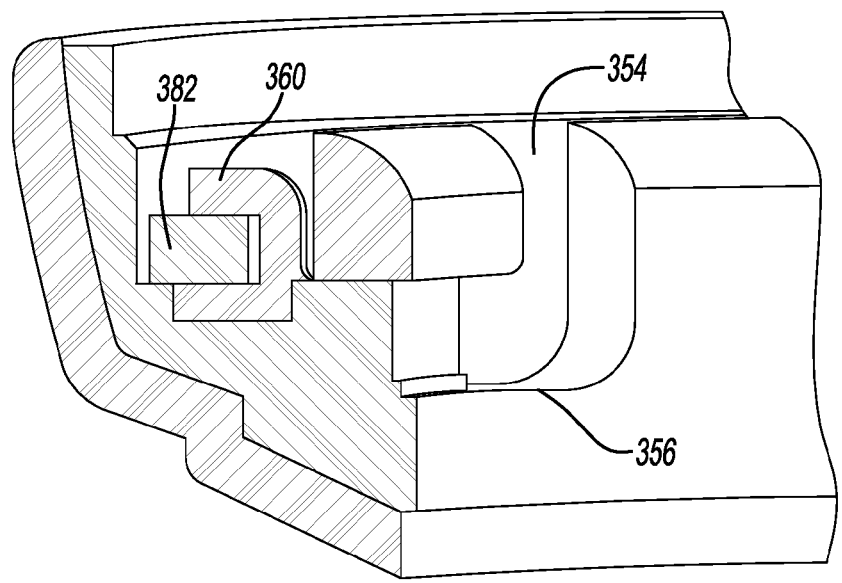
FIG. 26 represents a perspective cross-sectional view of the holder subassembly shown in FIG. 25.
Figure 27:
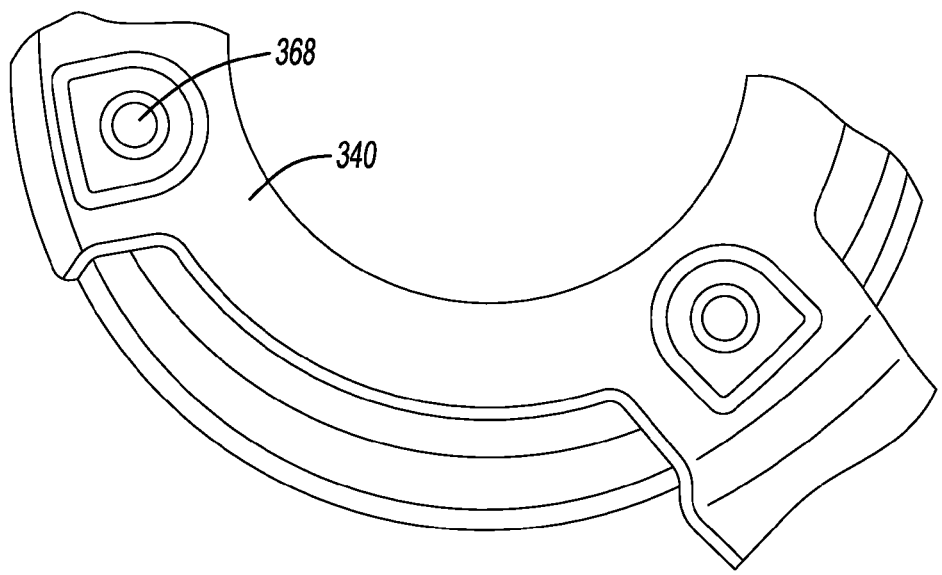
FIG. 27 represents a front view of the holder subassembly shown in FIGS. 25 and 26.

FIGS. 25-27 represent an alternate embodiment of a holder 340 having an alternate circuit board to transparent cover coupling mechanism. In this regard, the holder 340 contains a transparent cover 350 having an inner tubular member 352. The inner tubular member 352 defines a generally L-shaped coupling channel 354. The L-shaped coupling channel 354 defines a protruding locking feature 356 which engages a corresponding locking bayonet feature on the transmission housing.

Further defined on the inner tubular member 352 is a plurality of coupling notches 358. The notches 358 have a depth corresponding to the preferred locational position of the circuit board 382 within the transparent cover channel. Adjacent to the coupling notches 358 are corresponding coupling flanges 360 which are configured to be positioned within a corresponding set of notches defined within an inner surface of the circuit board 372. As described above, the coupling flanges 360 are configured to be melted in a heat staking process to rotationally and longitudinally fix the circuit board 382 within the channel. As best seen in FIG. 27, the holder can define discrete apertures 368 to allow light to be emitted from the nose section of the tool onto the workpiece. The holder 340 may have elastomeric overmolding to prevent damage to the workpiece and to the tool if the tool inadvertently strikes the workpiece.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A power tool comprising:
a housing having a large diameter rear portion and a narrow diameter nosepiece;
an end effector rotatably coupled to the housing;
a holder having a substantially annular holder body received over the nosepiece and non-rotatably coupled to the housing;
a substantially annular cover having at least one transparent surface, and an internal annular groove, the annular cover received at least partially inside the holder body, and non-rotatably and axially fixed with respect to the holder;
a substantially annular printed circuit board received at least partially inside the annular groove in the cover, and non-rotatably and axially fixed with respect to the cover; and
a plurality of lighting elements operatively connected to the printed circuit board and radially disposed about the printed circuit board, the lighting elements being aligned with the at least one transparent surface so as to illuminate a workpiece.

2. The power tool of claim 1, wherein the lighting elements are a plurality of light emitting diodes radially disposed about the printed circuit board.

3. The power tool of claim 1, wherein a portion of the end effector extends through concentric holes defined by the holder, the cover, and the printed circuit board.

4. The power tool of claim 1, further comprising a first coupler disposed between the holder and the housing, the first coupler preventing axial and rotational displacement of the holder with respect to the housing.

5. The power tool of claim 4, wherein the first coupler comprises a locking flange on the holder and a locking channel on the housing, wherein the locking flange engages the locking channel to prevent axial and rotational displacement of the holder with respect to the housing.

6. The power tool of claim 1, further comprising a second coupler disposed between the printed circuit board and the cover, said second coupler preventing axial and rotational displacement of the printed circuit board with respect to the cover.

7. The power tool of claim 6, wherein the second coupler comprises a notch defined in the printed circuit board and a tab extending from the cover, the tab received in the notch to non-rotatably fix the printed circuit board in the cover.

8. The power tool of claim 7, wherein the tab comprises a heat meltable projection configured to be melted to axially fix the printed circuit board in the cover.

9. The power tool of claim 1, further comprising a third coupler disposed between the holder and the cover, said third coupler preventing axial and rotational displacement of the holder with respect to the cover.

10. The power tool of claim 9, wherein the third coupler comprises a slot defined in the holder and a projection extending from the cover, the projection received in the slot to prevent axial and rotational displacement of the holder with respect to the cover.

11. The power tool of claim 1, further comprising a wire operably coupled to the printed circuit board to deliver power to the lighting elements, and wherein the cover further comprises a chin portion axially and radially outward from the holder body, the chin portion providing a protective case for the wire.

12. The power tool of claim 1, further comprising a coupling member covering the printed circuit board so that the lighting element and the printed circuit board are substantially entrapped by the coupling member and the cover.

13. The power tool of claim 12, wherein the coupling member is axially retained by the holder and attached to the housing.

14. A power tool comprising:
a housing;
an end effector rotatably coupled to the housing;
a substantially annular holder axially and non-rotatably coupled to the housing;
a substantially annular cover having a transparent portion, the cover axially and non-rotatably coupled to the holder;
a substantially annular printed circuit board having a plurality of light emitting elements and axially and non-rotatably coupled to the cover;
a first coupler disposed between the holder and the housing, the first coupler preventing axial and rotational displacement of the holder with respect to the housing;
a second coupler disposed between the printed circuit board and the cover, said second coupler preventing axial and rotational displacement of the printed circuit board with respect to the cover;

a third coupler disposed between the holder and the cover, said third coupler preventing axial and rotational displacement of the holder with respect to the cover.

15. The power tool of claim 14, wherein at least one of the first coupler, the second coupler, and the third coupler comprises at least one of a heat stake joint, a bayonet joint, and a locking flange.

16. The power tool of claim 14, wherein the first coupler comprises a locking flange on the holder and a locking channel on the housing, wherein the locking flange engages the locking channel to prevent axial and rotational displacement of the holder with respect to the housing.

17. The power tool of claim 14, wherein the second coupler comprises a notch defined in the printed circuit board and a tab extending from the cover, the tab received in the notch to non-rotatably fix the printed circuit board in the cover.

18. The power tool of claim 17, wherein the tab comprises a heat meltable projection configured to be melted to axially fix the printed circuit board in the cover.

19. The power tool of claim 14, wherein the third coupler comprises a slot defined in the holder and a projection extending from the cover, the projection received in the slot to prevent axial and rotational displacement of the holder with respect to the cover.

20. A power tool comprising:
a housing;
an end effector rotatably coupled to the housing;
a substantially annular holder axially and non-rotatably coupled to the housing;
a substantially annular cover having a transparent portion, the cover axially and non-rotatably coupled to the holder;
a substantially annular printed circuit board having a plurality of light emitting elements and axially and non-rotatably coupled to the cover;
a locking flange on the holder and a locking channel on the housing, wherein the locking flange engages the locking channel to prevent axial and rotational displacement of the holder with respect to the housing;
a notch defined in the printed circuit board and a tab extending from the cover, the tab received in the notch to non-rotatably fix the printed circuit board in the cover, wherein the tab comprises a heat meltable projection configured to be melted to axially fix the printed circuit board in the cover; and
a slot defined in the holder and a projection extending from the cover, the projection received in the slot to prevent axial and rotational displacement of the holder with respect to the cover.

* * * * *